(12) United States Patent
Morishita et al.

(10) Patent No.: US 8,927,680 B2
(45) Date of Patent: Jan. 6, 2015

(54) POLYCARBONATE RESIN AND COATING SOLUTION CONTAINING SAME, AND MOLDED ARTICLE PRODUCED BY MOLDING SAID COATING SOLUTION

(75) Inventors: Hironobu Morishita, Chiba (JP); Kengo Hirata, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 0 days.

(21) Appl. No.: 14/239,645

(22) PCT Filed: Aug. 16, 2012

(86) PCT No.: PCT/JP2012/070852
§ 371 (c)(1),
(2), (4) Date: Feb. 25, 2014

(87) PCT Pub. No.: WO2013/027654
PCT Pub. Date: Feb. 28, 2013

(65) Prior Publication Data
US 2014/0206814 A1   Jul. 24, 2014

(30) Foreign Application Priority Data

Aug. 19, 2011 (JP) ................................. 2011-179880

(51) Int. Cl.
| | | |
|---|---|---|
| *C08G 64/00* | (2006.01) | |
| *C08G 65/40* | (2006.01) | |
| *G03G 5/05* | (2006.01) | |
| *G03G 5/147* | (2006.01) | |
| *C08G 64/10* | (2006.01) | |
| *C09D 169/00* | (2006.01) | |
| *C08G 77/04* | (2006.01) | |
| *C09D 7/12* | (2006.01) | |
| *C08G 63/02* | (2006.01) | |

(52) U.S. Cl.
CPC .............. *C08G 65/40* (2013.01); *G03G 5/0564* (2013.01); *G03G 5/14756* (2013.01); *C08G 64/10* (2013.01); *C09D 169/00* (2013.01); *C08G 77/04* (2013.01); *C09D 7/1233* (2013.01)

USPC ........ 528/196; 264/1.7; 264/1.24; 264/176.1; 264/279; 428/411.1; 428/412; 528/198

(58) Field of Classification Search
CPC ....... C08G 64/307; C08G 64/06; C08J 7/047; B32B 27/08
USPC .............. 264/1.7, 1.24, 279; 428/411.1, 412; 528/196, 198
See application file for complete search history.

(56) References Cited

U.S. PATENT DOCUMENTS

2006/0135662 A1   6/2006   Mullen

FOREIGN PATENT DOCUMENTS

| JP | 04-323263 | | 11/1992 |
|---|---|---|---|
| JP | 08-225639 | | 9/1996 |
| JP | 10-130383 | | 5/1998 |
| JP | 11-172003 | | 6/1999 |
| JP | 2005-126727 | * | 5/2005 |
| JP | 2007-277524 | | 10/2007 |
| JP | 2008-525581 | | 7/2008 |
| WO | 2012/073970 | | 6/2012 |

OTHER PUBLICATIONS

International Search Report for corresponding International Application No. PCT/JP2012/070852, Sep. 11, 2012.

* cited by examiner

*Primary Examiner* — Terressa Boykin
(74) *Attorney, Agent, or Firm* — Oblon, Spivak, McClelland, Maier & Neustadt, L.L.P.

(57) ABSTRACT

A molded article produced by molding a coating solution that contains a polycarbonate resin represented by the following formula (1) has excellent transparency, good water repellency and oil repellency, a lower friction coefficient and excellent surface lubricity, having a capability of improving abrasion resistance. In the formula (1), $R_f$ represents a perfluoroalkyl group having 5 or more carbon atoms and 11 or more fluorine atoms or a perfluoroalkyl group having a specific structure; and W represents a divalent group including therein a specific structural unit.

17 Claims, No Drawings

POLYCARBONATE RESIN AND COATING SOLUTION CONTAINING SAME, AND MOLDED ARTICLE PRODUCED BY MOLDING SAID COATING SOLUTION

TECHNICAL FILED

The present invention relates to a polycarbonate resin having a specific structure in which a polymer terminal of the resin has a fluorine atom, a coating solution which includes therein the polycarbonate resin and a non-halogen solvent, and a molded article which is produced by molding the coating solution.

BACKGROUND ART

Polycarbonate resin, because of having excellent mechanical properties, thermal properties, transparency, and electrical properties, has been used as a material for molded articles in various industrial fields. Further in recent years, the polycarbonate resin has been used for many purposes in a field of functional products in which optical properties are used along with the above characteristic properties.

As the functional products, a coating which is formed by dissolving the polycarbonate resin in an organic solvent to prepare a coating solution and applying the coating solution onto a drum, a sheet or a film, and a cast film which is formed from the coating solution have been known. Examples of more specific products include: a coating which is formed on the surface of drums or rolls such as electrophotographic photoreceptor drums used for electrophotographic printers, charging rolls, or development rolls; a coating for insert molding films that are used for electronic products or in-vehicle products; a phase difference compensation film or an electroconductive film that is used for liquid crystal displays and others; and a surface protection film for touch panels or windows.

As the application fields of the polycarbonate resin have been expanding, requested performances have been diversified. In response to these requests, polycarbonate in the form of homopolymers, which are made from conventional raw materials such as 2,2-bis(4-hydroxyphenyl)propane (bisphenol A) or 1,1-bis(4-hydroxyphenyl)cyclohexane (bisphenol Z), does not satisfy sufficiently these requests in some cases. Therefore, polycarbonate resins having a variety of chemical structures, which are capable of meeting each performance specifically requested for each application respectively, are expected.

For instance, Patent Documents 1 to 6 disclose a molded article which is provided with water repellency, anti-fouling property, and low surface properties such as friction coefficient reduction by way of using a polycarbonate resin in which fluorine is introduced into the terminal thereof.

PRIER ART DOCUMENTS

Patent Documents

Patent Document 1: Japanese Patent Laid-Open Publication No. H4-323263
Patent Document 2: Japanese Patent Laid-Open Publication No. 2008-525581
Patent Document 3: Japanese Patent Laid-Open Publication No. 2007-277524
Patent Document 4: Japanese Patent Laid-Open Publication No. 2005-126727
Patent Document 5: Japanese Patent Laid-Open Publication No. H10-130383
Patent Document 6: Japanese Patent Laid-Open Publication No. H8-225639

SUMMARY OF THE INVENTION

Problems to be Solved by the Invention

However, the polycarbonate resin that is disclosed in the above Patent Documents 1 to 6 is not sufficient from the viewpoint of water repellency, surface lubricity, and abrasion resistance of a molded article that is produced from the resin.

It is an object of the present invention to provide a polycarbonate resin that is allowed to produce a molded article having excellent transparency, good water repellency and oil repellency, low friction coefficient, excellent surface lubricity, and capability of improving abrasion resistance, a coating solution that contains the polycarbonate resin, and a molded article that is molded by using the coating solution.

Means for Solving the Problems

The present inventors, as a result of repeated intensive studies, have found that a polycarbonate resin having a specific structure, which is different from the polycarbonate resins disclosed in Patent Documents 1 to 6 and has a perfluoroalkyl group at a polymer terminal and contains an ether bonding, has a capability of solving the above problems.

Namely, the present invention relates to the following items [1] to [15].

[1] A polycarbonate resin that is represented by the following formula (1).

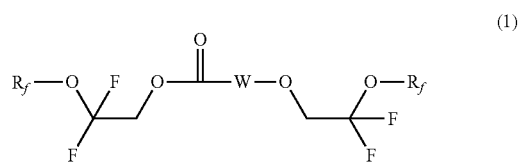

(1)

In the formula (1), $R_f$ represents a perfluoroalkyl group having 5 or more carbon atoms and 11 or more fluorine atoms or a perfluoroalkyloxy group represented by the following formula (2); W represents a structural unit represented by the following formula (3) or a divalent group that contains a naphthalene ring.

(2)

In the formula (2), $R_{f2}$ represents a straight-chain or branched perfluoroalkyl group having 1 to 6 carbon atoms; and $n^6$ represents an integer of 1 to 3.

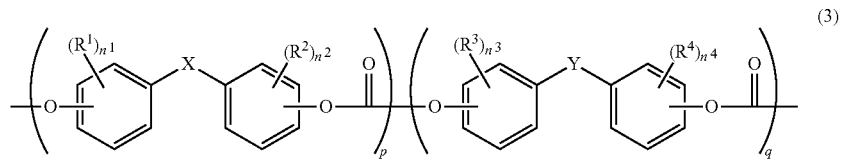

In the formula (3), each of p and q represents a composition ratio (mol ratio) of a structural unit in each bracket respectively; each of $R^1$ to $R^4$ represents, independently from each other, a halogen atom, an alkyl group that may have a substitution group and has 1 to 6 carbon atoms, an alkoxy group that may have a substitution group and has 1 to 6 carbon atoms, a fluoroalkyl group that may have a substitution group and has 1 to 6 carbon atoms, a fluoroalkoxy group that may have a substitution group and has 1 to 6 carbon atoms, or a phenyl group that may have a substitution group; X represents a single bonding, an alkylene group that may have a substitution group and has 1 to 18 carbon atoms, an alkylidene group that may have a substitution group and has 2 to 18 carbon atoms, a cycloalkylene group that may have a substitution group and has 5 to 15 carbon atoms, a cycloalkylidene group that may have a substitution group and has 5 to 15 carbon atoms, —S—, —SO—, —SO$_2$—, —O—, —CO—, or a divalent group represented by the following formula (4) or formula (5); each of $n^1$ and $n^2$ represents, independently from each other, an integer of 0 to 4; Y represents a single bonding, an alkylene group that may have a substitution group and has 1 to 18 carbon atoms, an alkylidene group that may have a substitution group and has 2 to 18 carbon atoms, a cycloalkylene group that may have a substitution group and has 5 to 15 carbon atoms, a cycloalkylidene group that may have a substitution group and has 5 to 15 carbon atoms, —S—, —SO—, —SO$_2$—, —O—, —CO—, or a divalent group represented by the following formula (4) or formula (5); and each of $n^3$ and $n^4$ represents, independently from each other, an integer of 0 to 4, but a case in which both $n^3$ and $n^4$ are zero and Y is an isopropylidene group is eliminated.

[2] The polycarbonate resin as described in [1], wherein W in the formula (1) has an organic siloxane containing group additionally.

[3] The polycarbonate resin as described in [2], wherein the organic siloxane containing group is a divalent group that has a structure represented by the following formula (6).

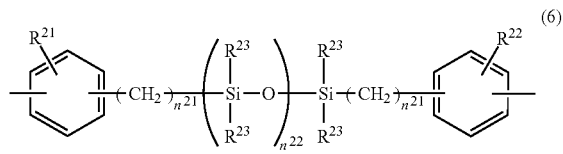

In the formula (6), each of $R^{21}$ and $R^{22}$ represents, independently from each other, a hydrogen atom, a halogen atom, a substituted or non-substituted alkyl group having 1 to 12 carbon atoms, a substituted or non-substituted alkoxy group having 1 to 12 carbon atoms, or a substituted or non-substituted aryl group having 6 to 12 carbon atoms; each $R^{23}$ represents, independently from each other, a substituted or non-substituted alkyl group having 1 to 12 carbon atoms or a substituted or non-substituted aryl group having 6 to 12 carbon atoms; each $n^{21}$ represents, independently from each other, an integer of 2 to 4; and $n^{22}$ represents an integer of 1 to 600.

[4] The polycarbonate resin as described in any of [1] to [3], wherein the polycarbonate resin represented by the formula (1) includes therein at least one of structural units represented by the following formulas (7) to (13).

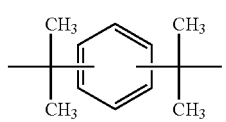

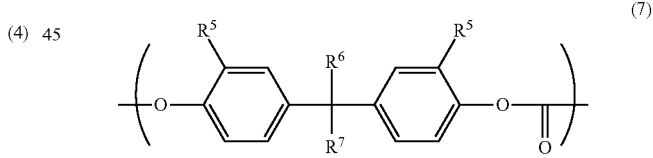

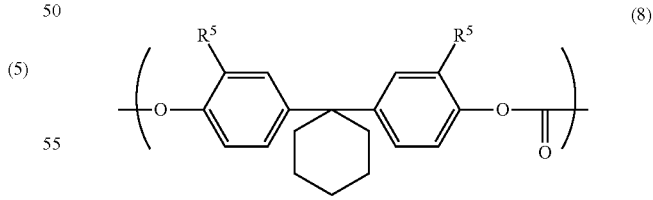

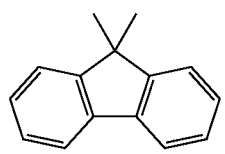

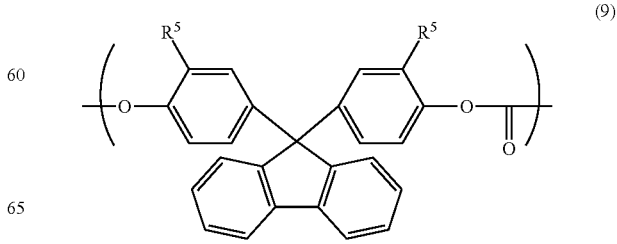

In the formula (5), benzene ring may be substituted with an alkyl group having 1 to 22 carbon atoms or a phenyl group that may have a substitution group.

-continued

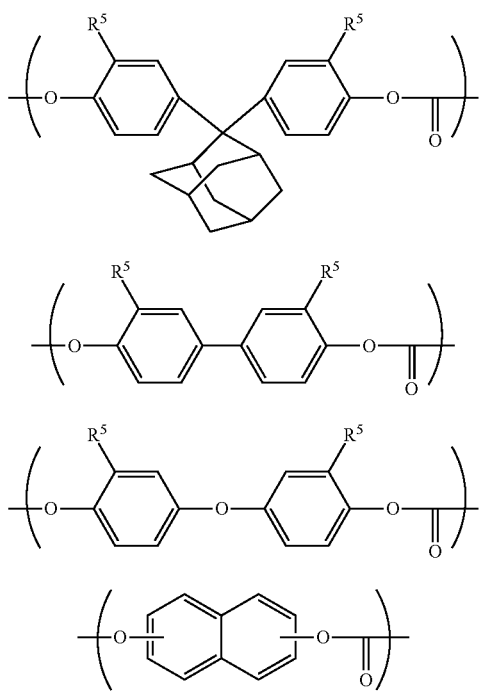

In the formulas, each of $R^5$ to $R^7$ represents, independently from each other, a hydrogen atom, a halogen atom, an alkyl group that may have a substitution group and has 1 to 6 carbon atoms, an alkoxy group that may have a substitution group and has 1 to 6 carbon atoms, a fluoroalkyl group that may have a substitution group and has 1 to 6 carbon atoms, a fluoroalkoxy group that may have a substitution group and has 1 to 6 carbon atoms, or a phenyl group that may have a substitution group.

[5] The polycarbonate resin as described in any of [1] to [4], which is produced by using any of fluorine-containing alcohols represented by the following formulas (14), (15), and (15a) as an end-terminator.

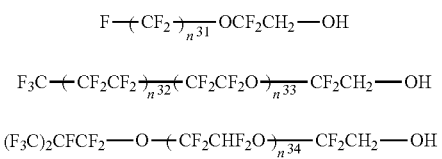

In the formulas, $n^{31}$ represents an integer of 5 to 8; $n^{32}$ represents an integer of 0 to 2; $n^{33}$ represents an integer of 1 to 3; and $n^{34}$ represents an integer of 1 to 3.

[6] The polycarbonate resin as described in any of [1] to [5], which is produced by using a bischloroformate oligomer represented by the following formula (16) as one of source chemicals.

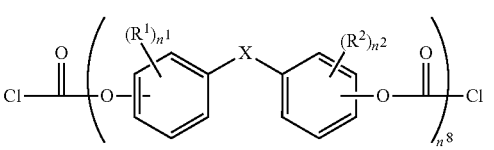

In the formula, each of $R^1$, $R^2$, $X$, $n^1$, and $n^2$ represents the same as in the formula (3); and $n^8$ represents an average number of monomeric units of the bischloroformate oligomer and the value thereof is 1.0 to 1.99.

[7] A polycarbonate resin containing coating solution, which includes therein the polycarbonate resin as described in any of [1] to [6] and a non-halogen solvent.

[8] The polycarbonate resin containing coating solution as described in [7], wherein the non-halogen solvent is at least one selected from a group consisting of an aromatic solvent, an ether solvent, a ketone solvent, an amide solvent, and an ester solvent.

[9] A molded article, which is produced by molding the polycarbonate resin containing coating solution as described in [7] or [8].

[10] The molded article as described in [9], which exhibits a water contact angle of 95 degree or more and a hexadecane contact angle of 20 degree or more as measured on the surface thereof.

[11] An electrophotographic photoreceptor, which includes therein at least the molded article as described in [9] or [10].

[12] A drum, which includes therein at least the molded article as described in [9] or [10].

[13] A roll, which includes therein at least the molded article as described in [9] or [10].

[14] A cast film, which is produced by molding the polycarbonate resin containing coating solution as described in [7] or [8], through a casting process.

[15] A coating film, which is produced by molding the polycarbonate resin containing coating solution as described in [7] or [8], through a coating process.

Effect of the Invention

The polycarbonate resin that has the specific structure according to the present invention is allowed to be dissolved in a variety of non-halogen organic solvents and to provide an uniform solution. A molded article, which is molded by using the solution as a coating solution, is allowed to be a molded article having excellent transparency, exhibiting good water repellency and oil repellency, further having low friction coefficient, excellent surface lubricity and abrasion resistance.

MODE FOR CARRYING OUT THE INVENTION

Hereinafter, the polycarbonate resin of the present invention; the polycarbonate resin containing coating solution (hereinafter, also simply called as "coating solution") that is a non-halogen solvent solution including therein the polycarbonate resin; and the molded article that is produced by molding the coating solution will be described.

Polycarbonate Resin

The polycarbonate resin of the present invention is a polycarbonate resin that is represented by the following formula (1).

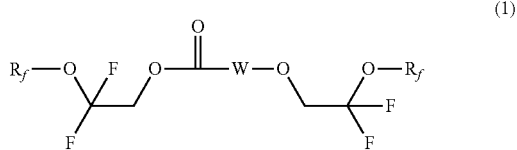

(1)

In the formula (1), $R_f$ represents a perfluoroalkyl group having 5 or more carbon atoms and 11 or more fluorine atoms or a perfluoroalkyloxy group represented by the following formula (2).

(2)

In the formula (2), $R_{f2}$ represents a straight-chain or branched perfluoroalkyl group having 1 to 6 carbon atoms; and $n^6$ represents an integer of 1 to 3.

The polycarbonate resin of the present invention has, as an end functional group, a perfluoroalkyl group having a given number or more of fluorine atoms or a perfluoroalkyloxy group having a specific structure. The functional group is bonded through an ether bonding, so that the transparency of a molded article that is made from the polycarbonate resin is improved and that good water repellency and oil repellency are developed, the friction coefficient is reduced, and the surface lubricity is improved. In particular, the surface of a molded article that is coated with the polycarbonate of the present invention is strong against abrasion. In addition, degradation in friction coefficient, lowering in water repellency, and others after abrasion, are allowed to be suppressed.

When $R_f$ is a perfluoroalkyl group, the number of carbon atoms included in the perfluoroalkyl group is 5 or more and preferably 6 to 8. It is undesirable that the number of carbon atoms is less than 5, because sufficient water repellency and oil repellency and low friction coefficient are not attainable. Furthermore, the number of fluorine atoms included in the perfluoroalkyl group is 11 or more and preferably 12 to 17. It is undesirable that the number of fluorine atoms is less than 11, because water repellency and oil repellency are not sufficiently developed in a molded article of the polycarbonate resin.

In addition, when $R_f$ is a perfluoroalkyloxy group represented by the formula (2), the number of carbon atoms included in the group represented by the formula (2) is preferably 3 to 11 and more preferably 5 to 9. Furthermore, the number of fluorine atoms included in the perfluoroalkyloxy group is preferably 7 to 21 and more preferably 11 to 17.

In addition, the number of carbon atoms included in $R_{f2}$ of the formula (2) is 1 to 6, preferably 2 to 5, and more preferably 3 to 4. $n^6$ is an integer of 1 to 3 and preferably an integer of 1 to 2.

Furthermore, W in the formula (1) represents a structural unit represented by the following formula (3) or a divalent group having a naphthalene ring.

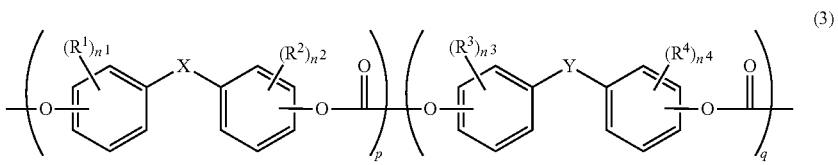

(3)

In the formula (3), each of p and q represents a composition ratio (mol ratio) of a structural unit in each bracket respectively.

The composition ratio (mol ratio) of p to q [p/q] is, from the viewpoint of solubility, abrasion resistance, and others, preferably 30/70 to 95/5, more preferably 40/60 to 90/10, and still more preferably 45/55 to 85/15.

Each of $R^1$ to $R^4$ in the formula (3) is, independently from each other, a halogen atom, an alkyl group that may have a substitution group and has 1 to 6 carbon atoms, an alkoxy group that may have a substitution group and has 1 to 6 carbon atoms, a fluoroalkyl group that may have a substitution group and has 1 to 6 carbon atoms, a fluoroalkoxy group that may have a substitution group and has 1 to 6 carbon atoms, or a phenyl group that may have a substitution group.

Examples of the halogen atom include a fluorine atom, a chlorine atom, a bromine atom, and an iodine atom.

Examples of the alkyl group having 1 to 6 carbon atoms include a methyl group, an ethyl group, an n-propyl group, an isopropyl group, an n-butyl group, a t-butyl group, a t-pentyl group, and an n-hexyl group. From the view point of transparency and abrasion resistance, an alkyl group having 1 to 3 carbon atoms is preferable. Examples of the substitution group include a halogen atom such as a chlorine atom.

Examples of the alkoxy group having 1 to 6 carbon atoms include a methoxy group, an ethoxy group, a propoxy group, a butoxy group, a pentyloxy group, and a hexyloxy group. From the view point of transparency and abrasion resistance, an alkoxy group having 1 to 3 carbon atoms is preferable. Examples of the substitution group include a halogen atom such as a chlorine atom.

Examples of the fluoroalkyl group having 1 to 6 carbon atoms include a fluoromethyl group, a trifluoromethyl group, a fluoroethyl group, a pentafluoroethyl group, a heptafluoropropyl group, and a nonafluorobutyl group.

Examples of the fluoroalkoxy group having 1-6 carbon atoms include a trifluoromethoxy group and a difluoromethoxy group.

Examples of the substitution group in the phenyl group that may have a substitution group include a halogen atom and the aforementioned alkyl group having 1 to 6 carbon atoms.

Among these, from the viewpoint of transparency and abrasion resistance, a halogen atom, the alkyl group that may have a substitution group and has 1 to 6 carbon atoms, the fluoroalkyl group that may have a substitution group and has 1 to 6 carbon atoms, and the phenyl group that may have a substitution group are preferable. A methyl group, a phenyl group, fluorine, and a trifluoromethyl group are more preferable.

X in the formula (3) represents a single bonding, an alkylene group that may have a substitution group and has 1 to 18 carbon atoms, an alkylidene group that may have a substitution group and has 2 to 18 carbon atoms, a cycloalkylene group that may have a substitution group and has 5 to 15 carbon atoms, a cycloalkylidene group that may have a substitution group and has 5 to 15 carbon atoms, —S—, —SO—, —SO$_2$—, —O—, —CO—, or a divalent group represented by the following formula (4) or the following formula (5).

Note that, examples of the substitution group in the alkylene, alkylidene, cycloalkylene, and cycloalkylidene groups that may have a substitution group and are represented by X include an alkyl group that has 1 to 6 carbon atoms, a halogen atom such as a fluorine atom, a chlorine atom, a bromine atom and an iodine atom, and a phenyl group.

Examples of the alkyl group include the same as the group exemplified for the alkyl group that has 1 to 6 carbon atoms and is represented by each of $R^1$ to $R^4$ in the formula (3). In addition, preferable ones are also the same. The halogen atom is preferably a chlorine atom.

Note that, the benzene ring in the formula (5) may be substituted by an alkyl group having 1 to 22 carbon atoms or a phenyl group that may have a substitution group. Examples of the substitution group include an alkyl group having 1 to 6 carbon atoms and a halogen atom. In addition, in the formula (4), 1-methylethylidene group is preferably bonded at the positions of 1 and 3 or 1 and 4 of benzene ring.

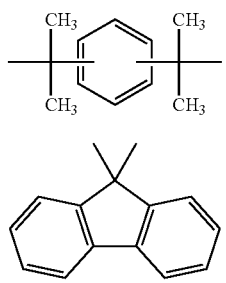

(4)

(5)

Among these divalent groups of X, from the viewpoint of solubility, abrasion resistance, and others, an alkylene group that may have a substitution group and has 1 to 18 carbon atoms, an alkylidene group that may have a substitution group and has 2 to 18 carbon atoms, and a cycloalkylidene group that may have a substitution group and has 5 to 15 carbon atoms are preferable.

Examples of the alkylene group having 1 to 18 carbon atoms include a methylene group, an ethylene group, an n-propylene group, an isopropylene group, an n-butylene group, an isobutylene group, an n-pentylene group, an n-hexylene group, an n-heptylene group, an n-octylene group, a 2-ethylhexylene group, an n-nonylene group, an n-decylene group, an n-undecylene group, an n-dodecylene group, an n-tridecylene group, an n-tetradecylene group, an n-pentadecylene group, an n-hexadecylene group, an n-heptadecylene group, and an n-octadecylene group. An alkylene group having 1 to 8 carbon atoms is preferable. An alkylene group having 1 to 4 carbon atoms is more preferable.

Examples of the alkylidene group having 2 to 18 carbon atoms include an ethylidene group, an n-propylidene group, an isopropylidene group, an n-butylidene group, an isobutylidene group, a sec-butylidene group, an n-pentylidene group, an isopentylidene group, an n-hexylidene group, an n-heptylidene group, an n-octylidene group, and an isooctylidene group. An alkylidene group having 2 to 5 carbon atoms is preferable. An ethylidene group, a propylidene group, an isopropylidene group, and a sec-butylidene group are more preferable.

Examples of the cycloalkylene group having 5 to 15 carbon atoms include a cyclopentylene group, a cyclohexylene group, a cyclooctylene group, a cyclodecylene group, a cyclotetradecylene group, and 1,3-adamantyl group. A cycloalkylene group having 5 to 10 carbon atoms is preferable.

Examples of the cycloalkylidene group having 5 to 15 carbon atoms include a cyclopentylidene group, a cylohexylidene group, a cyclooctylidene group, a cyclodecylidene group, and a 2,2-adamantyl group. A cycloalkylidene group having 5 to 10 carbon atoms is preferable. A cyclohexylidene group is more preferable.

Y in the formula (3) represents a single bonding, an alkylene group that may have a substitution group and has 1 to 18 carbon atoms, an alkylidene group that may have a substitution group and has 2 to 18 carbon atoms, a cycloalkylene group that may have a substitution group and has 5 to 15 carbon atoms, a cycloalkylidene group that may have a substitution group and has 5 to 15 carbon atoms, —S—, —SO—, —SO$_2$—, —O—, —CO—, or a divalent group represented by the formula (4) or formula (5).

Specific groups of the alkylene group having 1 to 18 carbon atoms, the alkylidene group having 2 to 18 carbon atoms, the cycloalkylene group having 5 to 15 carbon atoms, and the cycloalkylidene group having 5 to 15 carbon atoms include the same groups as exemplified for X described above. In addition, preferable ones are the same.

Among these divalent groups of Y, from the viewpoint of abrasion resistance and mechanical strength, a single bonding and the divalent group represented by the formula (5) are preferable. On the other hand, from the viewpoint of water repellency, oil repellency, and surface lubricity, a cycloalkylidene group having 5 to 15 carbon atoms is preferable.

In the formula (3), each of $n^1$ and $n^2$ represents, independently from each other, an integer of 0 to 4.

In addition, each of $n^3$ and $n^4$ represents, independently from each other, an integer of 0 to 4, but a case in which both $n^3$ and $n^4$ are zero and Y is an isopropylidene group is eliminated. Except a case of a polycarbonate that is made from only a repeating unit derived from bisphenol A, X and Y may be the same. Note that, when both X and Y are a single boding, —O—, —CO—, a methylene group, or an ethylidene group, each of $R^1$ to $R^4$ is required to have an alkyl group that may have a substitution group and has 1 to 6 carbon atoms, an alkoxy group that may have a substitution group and has 1 to 6 carbon atoms, or a phenyl group that may have a substitution group, because crystallization and solubility might be degraded.

In the present invention, W in the formula (1) preferably has an organic siloxane containing group additionally. Having the organic siloxane containing group improves surface lubricity, because the friction coefficient of a molded article is lowered. The organic siloxane containing group is, from the aforementioned viewpoint, preferably a divalent group that has a structure represented by the following formula (6).

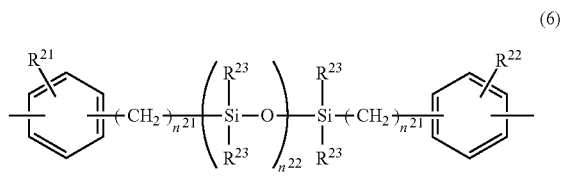
(6)

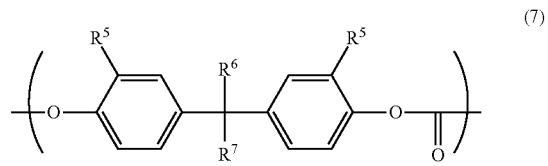
(7)

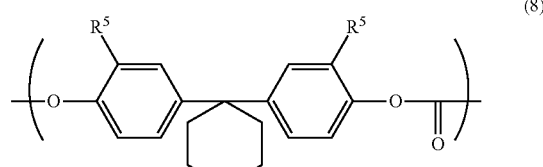
(8)

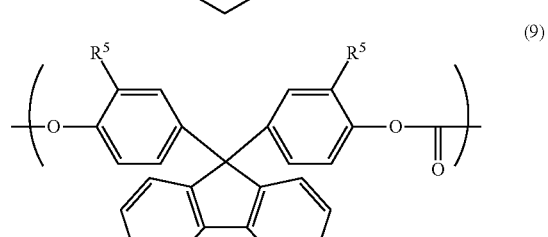
(9)

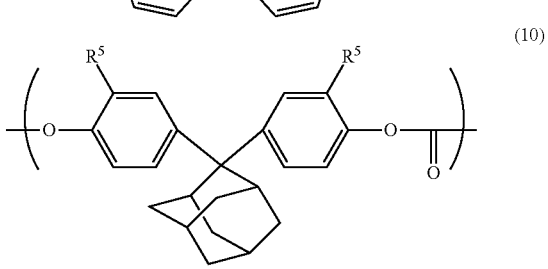
(10)

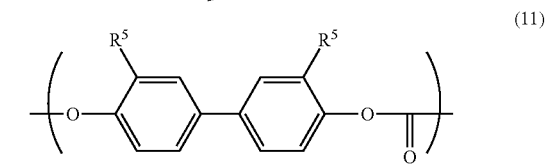
(11)

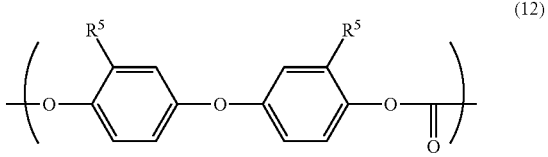
(12)

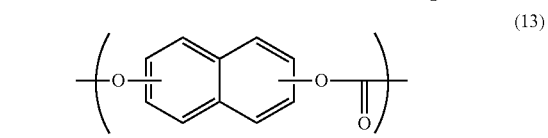
(13)

In the formula (6), each of $R^{21}$ and $R^{22}$ represents, independently from each other, a hydrogen atom, a halogen atom, a substituted or non-substituted alkyl group having 1 to 12 carbon atoms, a substituted or non-substituted alkoxy group having 1 to 12 carbon atoms, or a substituted or non-substituted aryl group having 6 to 12 carbon atoms; each $R^{23}$ represents, independently from each other, a substituted or non-substituted alkyl group having 1 to 12 carbon atoms or a substituted or non-substituted aryl group having 6 to 12 carbon atoms.

Examples of the halogen atom that is represented by each of $R^{21}$ and $R^{22}$ include a fluorine atom, a chlorine atom, a bromine atom, and an iodine atom.

Examples of the substituted or non-substituted alkyl group having 1 to 12 carbon atoms that is represented by each of $R^{21}$ and $R^{22}$ include a methyl group, an ethyl group, an n-propyl group, and an isopropyl group. The substitution group includes a halogen atom.

Examples of the alkyl group that composes the substituted or non-substituted alkoxy group having 1 to 12 carbon atoms that is represented by each of $R^{21}$ and $R^{22}$ include specifically the aforementioned alkyl groups. The substitution group includes a halogen atom.

Examples of the substituted or non-substituted aryl group having 6 to 12 carbon atoms that is represented by each of $R^{21}$ and $R^{22}$ include a phenyl group. The substitution group includes a halogen atom and an alkyl group having 1 to 12 carbon atoms.

Examples of the substituted or non-substituted alkyl group having 1 to 12 carbon atoms that is represented by $R^{23}$ include the same ones as each of $R^{21}$ and $R^{22}$. A preferable one is a methyl group. Examples of the substituted or non-substituted aryl group having 6 to 12 carbon atoms that is represented by $R^{23}$ include a phenyl group. The substitution group includes a halogen atom or an alkyl group having 1 to 12 carbon atoms.

In the formula (6), each $n^{21}$ is, independently from each other, an integer of 2 to 4. $n^{22}$ is an integer of 1 to 600, preferably 2 to 100, and more preferably 3 to 50.

In the structure that is represented by W of the formula (1), the content ratio (mol ratio) of the organic siloxane containing group is, when a molded article is required to have high elasticity, abrasion resistance, low friction coefficient, and others, preferably 0.05 mol % to 10 mol %, more preferably 0.1 mol % to 5 mol %, and still more preferably 0.15 mol % to 3 mol %. On the other hand, when a molded article is required to have low elasticity and high elongation, 3 mol % to 15 mo % is preferable.

The polycarbonate resin that is represented by the formula (1) includes therein, from the viewpoint of mechanical strength, such as solubility, abrasion resistance, and others, preferably, at least one selected from the structural units represented by the following formulas (7) to (13).

In the formulas (7) to (13), each of $R^5$ to $R^7$ represents, independently from each other, a hydrogen atom, a halogen atom, an alkyl group that may have a substitution group and has 1 to 6 carbon atoms, an alkoxy group that may have a substitution group and has 1 to 6 carbon atoms, a fluoroalkyl group that may have a substitution group and has 1 to 6 carbon atoms, a fluoroalkoxy group that may have a substitution group and has 1 to 6 carbon atoms, or a phenyl group that may have a substitution group.

The halogen atom, the alkyl group that may have a substitution group and has 1 to 6 carbon atoms, the alkoxy group that may have a substitution group and has 1 to 6 carbon atoms, the fluoroalkyl group that may have a substitution group and has 1 to 6 carbon atoms, the fluoroalkoxy group that may have a substitution group and has 1 to 6 carbon atoms, or a phenyl group that may have a substitution group, which are represented by each of $R^5$ to $R^7$, are the same as exemplified for each of $R^1$ to $R^4$. In addition, preferable ones are the same.

Source Chemicals for Polycarbonate Resin

The polycarbonate resin that is represented by the formula (1) may be synthesized by using, as starting source chemicals, corresponding bisphenol or dihydroxy naphthalene that is represented by the following formula (17) or (18) and a fluorine-containing alcohol that is represented by the following formula (19).

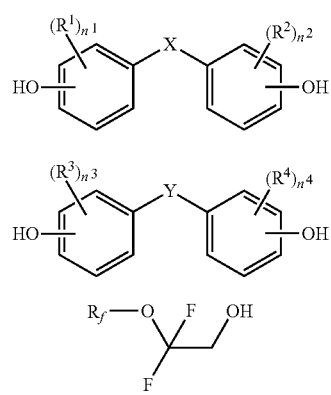

Each of $R^1$, $R^2$, X, $n^1$, and $n^2$ in the formula (17), each of $R^3$, $R^4$, Y, $n^3$, and $n^4$ in the formula (18), and $R_f$ in the formula (19) are the same in the formulas (1) and (3).

Examples of the bisphenol compound of the formula (17) or (18) include 1,1-bis(3-methyl-4-hydroxyphenyl)ethane, 9,9-bis(3-phenyl-4-hydroxyphenyl)fluorene, bis(4-hydroxyphenyl)methane, 1,1-bis(4-hydroxyphenyl)ethane, 1,2-bis (4-hydroxyphenyl)ethane, 2,2-bis(3-methyl-4-hydroxyphenyl)butane, 2,2-bis(4-hydroxyphenyl)butane, 2,2-bis(4-hydroxyphenyl)octane, 4,4-bis(4-hydroxyphenyl)heptane, 1,1-bis(4-hydroxyphenyl)-1,1-diphenyl methane, 1,1-bis(4-hydroxyphenyl)-1-phenyl ethane, 1,1-bis(4-hydroxyphenyl)-1-phenyl methane, bis(4-hydroxyphenyl)ether, bis(4-hydroxyphenyl)sulfide, bis(4-hydroxyphenyl)sulfone, 1,1-bis(4-hydroxyphenyl)cyclopentane, 1,1-bis(3-methyl-4-hydroxyphenyl)cyclopentane, 1,1-bis(4-hydroxyphenyl)cyclohexane, 2,2-bis(3-methyl-4-hydroxyphenyl)propane, 2,2-bis(3-phenyl-4-hydroxyphenyl)propane, 2,2-bis(4-hydroxyphenyl)adamantane, 2,2-bis(3-methyl-4-hydroxyphenyl)adamantane, 1,3-bis(4-hydroxyphenyl)adamantane, 1,3-bis(3-methyl-4-hydroxyphenyl)adamantane, 2-(3-methyl-4-hydroxyphenyl)-2-(4-hydroxyphenyl)-1-phenylethane, bis (3-methyl-4-hydroxyphenyl)sulfide, bis(3-methyl-4-hydroxyphenyl)sulfone, bis(3-methyl-4-hydroxyphenyl) methane, 1,1-bis(3-methyl-4-hydroxyphenyl)cyclohexane, 2,2-bis(2-methyl-4-hydroxyphenyl)propane, 1,1-bis(2-butyl-4-hydroxy-5-methylphenyl)butane, 1,1-bis(2-tert-butyl-4-hydroxy-3-methylphenyl)ethane, 1,1-bis(2-tert-butyl-4-hydroxy-5-methylphenyl)propane, 1,1-bis(2-tert-butyl-4-hydroxy-5-methylphenyl)butane, 1,1-bis(2-tert-butyl-4-hydroxy-5-methylphenyl)isobutene, 1,1-bis(2-tert-butyl-4-hydroxy-5-methylphenye heptane, 1,1-bis(2-tert-butyl-4-hydroxy-5-methylphenyl)-1-phenylmethane, 1,1-bis(2-tert-amyl-4-hydroxy-5-methylphenyl)butane, bis(3-chloro-4-hydroxyphenyl)methane, bis(3,5-dibromo-4-hydroxyphenyl)methane, 2,2-bis(3-chloro-4-hydroxyphenyl)propane, 2,2-bis(3-fluoro-4-hydroxyphenyl)propane, 2,2-bis(3-bromo-4-hydroxyphenyl)propane, 2,2-bis(3,5-difluoro-4-hydroxyphenyl)propane, 2,2-bis(3,5-dichloro-4-hydroxyphenyl)propane, 2,2-bis(3,5-dibromo-4-hydroxyphenyl) propane, 2,2-bis(3-bromo-4-hydroxy-5-chlorophenyl) propane, 2,2-bis(3,5-dichloro-4-hydroxyphenyl)butane, 2,2-bis(3,5-dibromo-4-hydroxyphenyl)butane, 1-phenyl-1,1-bis (3-fluoro-4-hydroxyphenyl)ethane, bis(3-fluoro-4-hydroxyphenyl)ether, 4,4'-dihydroxybiphenyl, 3,3'-dimethyl-4,4'-dihydroxybiphenyl, 3,3'-difluoro-4,4'-dihydroxybiphenyl, 1,1-bis(3-cyclohexyl-4-hydroxyphenyl) cyclohexane, 2,2-bis(4-hydroxyphenyl)hexafluoropropane, 1,1-bis(3-phenyl-4-hydroxyphenyl)cyclohexane, bis(3-phenyl-4-hydroxyphenyl)sulfone, 4,4'-(3,3,5-trimethylcyclohexylidene)diphenol, 4,4'-[1,4-phenylenebis(1-methylethylidene)]bisphenol, 4,4'-[1,3-phenylenebis(1-methylethylidene)]bisphenol, 9,9-bis(4-hydroxyphenyl) fluorene, and 9,9-bis(4-hydroxy-3-methylphenyl)fluorene. These bisphenol compounds may be used solely or in combination of two or more kinds.

Note that, the bisphenols represented by the formula (18) do not include 2,2-bis(4-hydroxyphenylpropane) (bisphenol A). This is because problems such as lowering in solubility and easy crystallization might occur when both bisphenols represented by the formulas (17) and (18) are bisphenol A. Furthermore, a compound such as 2,7-dihydroxy naphthalene, which is given by bonding two hydroxyl groups to a naphthalene ring, may be included.

Among these, preferable ones include 1,1-bis(4-hydroxyphenyl)ethane, 2,2-bis(4-hydroxyphenyl)butane, 1,1-bis(4-hydroxyphenyl)-1-phenylethane, 1,1-bis(4-hydroxyphenyl) cyclopentane, 1,1-bis(4-hydroxyphenyl)cyclohexane, 1,1-bis(3-methyl-4-hydroxyphenyl)cyclohexane, 1,1-bis(3-methyl-4-hydroxyphenyl)cyclopentane, 4,4'-dihydroxybiphenyl, 3,3'-dimethyl-4,4'-dihydroxybiphenyl, 4,4'-dihydroxydiphenylether, 4,4'-[1,4-phenylenebis(1-methylethylidene)]bisphenol, 4,4'-[1,3-phenylenebis(1-methylethylidene)]bisphenol, 9,9-bis(4-hydroxyphenyl)fluorene, 9,9-bis(4-hydroxy-3-methylphenyl)fluorene, 2,2-bis(4-hydroxyphenyl)adamantane, 2,7-dihydroxynaphthalene, and 2,2-bis(4-hydroxyphenyl)hexafluoropropane.

More preferable ones include 2,2-bis(4-hydroxyphenyl) butane, 1,1-bis(4-hydroxyphenyl)cyclohexane, 1,1-bis(3-methyl-4-hydroxyphenyl)cyclohexane, 2,2-bis(3-methyl-4-hydroxyphenyl)propane, 9,9-bis(4-hydroxy-3-methylphenyl)fluorene, 4,4'-dihydroxybiphenyl, 3,3'-dimethyl-4,4'-dihydroxybiphenyl, 4,4'-dihydroxydiphenylether, and 2,2-bis(4-hydroxyphenyl) hexafluoropropane.

In addition, the polycarbonate resin of the present invention may be derived from two or more kinds of the bisphenols that are represented by the formula (17) or (18), but the polycarbonate resin may include the one that is derived from the other bisphenol compounds (hereinafter, also referred to as "third component") besides the compounds of the formula (17) or (18), within a range that is not against the purpose of the present invention.

The third component includes 2,2-bis(4-hydroxyphenyl) propane (bisphenol A) and an organic siloxane group containing bisphenol. An organic siloxane group containing bisphenol that is represented by the following formula (20) is included.

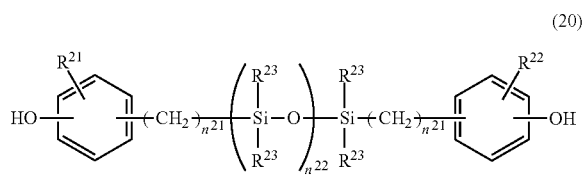
(20)

In the formula (20), each of $R^{21}$ to $R^{23}$, $n^{21}$, and $n^{22}$ are the same as in the formula (6).

The fluorine-containing alcohol that is represented by the formula (19) is used as an end-terminator. Regarding the fluorine-containing alcohol, any of fluorine-containing alcohols that are represented by the following formulas (14), (15), and (15a) is used as an end-terminator, preferably.

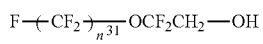
(14)

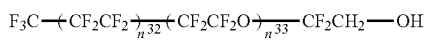
(15)

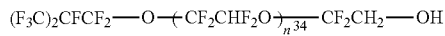
(15a)

In the formula (14), $n^{31}$ represents an integer of 5 to 8. In the formula (15), $n^{32}$ represents an integer of 0 to 2 and $n^{33}$ represents an integer of 1 to 3. In the formula (15a), $n^{34}$ represents an integer of 1 to 3.

In a preferable fluorine-containing alcohol, 2 to 6 of successive fluoroalkyl chains are linked through an ether bonding, and the total fluorine atom number is 13 to 19. When the total fluorine atom number is 13 or more, sufficient water repellency and oil repellency may be developed. On the other hand, in the case of 19 or less, lowering in reactivity upon polymerization may be suppressed, and the resulting polycarbonate resin may have improved mechanical strength, surface hardness, heat resistance, and others.

Furthermore, a fluorine-containing alcohol that has two or more ether bondings is preferable. Such fluorine-containing alcohol is allowed to improve dispersability of the resin, enhance abrasion resistance, and keep surface lubricity, water repellency, and oil repellency after abrasion.

Examples of the fluorine-containing alcohol include the following compounds.

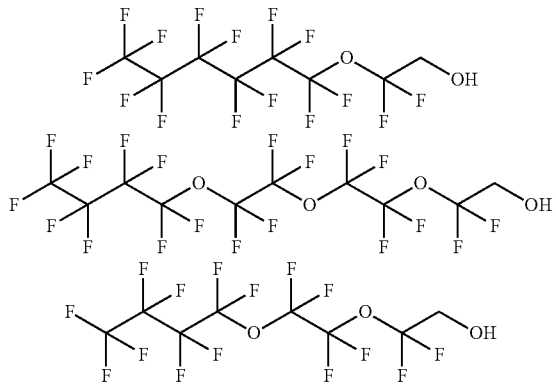

-continued

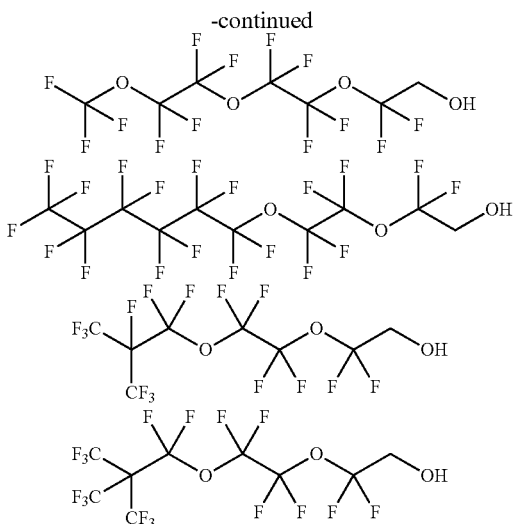

For the polycarbonate resin of the present invention, the other end-terminators are usable along with the above fluorine-containing alcohol.

As the other end-terminators, a monocarboxylic acid or the derivatives thereof, a monohydric phenol, and others are usable in a mixture. Examples of the other end-terminators include p-tert-butyl phenol, p-phenyl phenol, p-cumyl phenol, p-perfluorononyl phenol, p-(perfluorononylphenyl)phenol, p-perfluorooctyl phenol, p-perfluoroheptyl phenol, p-perfluorohexyl phenol, p-perfluoropentyl phenol, p-perfluorobutyl phenol, p-tert-perfluorobutyl phenol, 1-(p-hydroxybenzyl)perfluorodecane, p-[2-(1H, 1H-perfluorotridecyloxy)-1,1,1,3,3,3-hexafluoropropyl]phenol, 3,5-bis (perfluorohexyloxycarbonyl)phenol, p-hydroxybenzoic acid perfluorododecyl, p-(1H,1H-perfluorooctyloxy)phenol, 2H,2H,9H-perfluorononanic acid, 1,1,1,3,3,3-tetrafluoro-2-propanol, and fluoroalcohols represented by the following formulas.

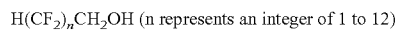

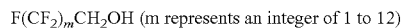

Among these other end-terminators, a phenol that has a perfluoroalkyl group or a terminal-hydrogen substituted perfluoroalkyl group at a part or all of the molecular ends thereof, 1,1-dihydro-1-perfluoroalkyl alcohol, 1,1,ω-trihydro-1-perfluoroalkyl alcohol, and others are preferable.

The ratio of the end-terminator added is, in terms of copolymerization composition ratio, preferably 0.05 mol % to 30 mol %, more preferably 0.1 mol % to 10 mol %. A ratio of 0.05 mol % or more ensures good moldability. A ratio of 30 mol % or less ensures good mechanical strength.

In addition, to the polycarbonate resin of the present invention, a branching agent may be introduced.

Examples of the branching agent include phloroglucin, pyrogallol, 4,6-dimethyl-2,4,6-tris(4-hydroxyphenyl)-2-heptene, 2,6-dimethyl-2,4,6-tris(4-hydroxyphenyl)-3-heptene, 2,4-dimethyl-2,4,6-tris(4-hydroxyphenyl)heptane, 1,3,5-tris(2-hydroxyphenyl)benzene, 1,3,5-tris(4-hydroxyphenyl)benzene, 1,1,1-tris(4-hydroxyphenyl) ethane, tris(4-hydroxyphenyl)phenylmethane, 2,2-bis[4,4-bis(4-hydroxyphenyl)cyclohexyl]propane, 2,4-bis[2-bis(4-hydroxyphenyl)-2-propyl]phenol, 2,6-bis(2-hydroxy-5-methylbenzyl)-4-methylphenol, 2-(4-hydroxyphenyl)-2-(2, 4-dihydroxyphenyl)propane, tetrakis(4-hydroxyphenyl)

methane, tetrakis[4-(4-hydroxyphenylisopropyl)phenoxy] methane, 2,4-dihydroxy benzoic acid, trimesic acid, cyanuric acid, 3,3-bis(3-methyl-4-hydroxyphenyl)-2-oxo-2,3-dihydroindole, 3,3-bis(4-hydroxyaryl)oxyindole, 5-chloroisatin, 5,7-dichloroisatin, and 5-bromoisatin.

The addition amount of these branching agents is, in terms of copolymerization composition ratio, preferably 30 mol % or less and more preferably 5 mol % or less. An addition amount of 30 mol % or less ensures good moldability.

The molecular weight of the polycarbonate resin according to the present invention is, although an appropriate range thereof is different depending on usage of a coating solution and others, generally, from the viewpoint of moldability, in terms of a reduced viscosity [$\eta_{SP}$/C] of a 0.5 g/dl methylene chloride solvent solution at a temperature of 20° C., preferably 0.2 dl/g to 2 dl/g and more preferably 0.2 dl/g to 1.1 dl/g.

Production Process of Polycarbonate Resin

Then, a production process of the polycarbonate resin of the present invention will be described.

The polycarbonate resin may be produced, through interfacial polymerization, by using bisphenol or dihydroxy naphthalene represented by the formula (17) or (18), a fluorine-containing alcohol represented by the formula (19), and a carbonate precursor such as phosgene.

In addition, the polycarbonate resin may be produced through known non-phosgene production processes such as an ester exchange process. Specifically, in an inert organic solvent such as methylene chloride, in the presence of a known acid acceptor such as sodium hydroxide or a molecular weight conditioner (the aforementioned end-terminator such as a fluorine-containing alcohol), if necessary, a catalyst or the aforementioned branching agent is added, the aforementioned bisphenol, the other bisphenol compound that is used as needed, the fluorine-containing alcohol, and the carbonate precursor such as phosgene are reacted.

Examples of the inert organic solvent include: chlorinated hydrocarbons such as dichloromethane(methylene chloride), trichloromethane, carbon tetrachloride, 1,1-dichloroethane, 1,2-dichloroethane, 1,1,1-trichloroethane, 1,1,2-trichloroethane, 1,1,1,2-tetrachloroethane, 1,1,2,2-tetrachloroethane, pentachloroethane, and chlorobenzene; toluene; and acetophenone. Among these, methylene chloride is preferable. Note that, these inert organic solvents may be used solely or in combination of two or more kinds.

The catalyst used herein is preferably a phase-transfer catalyst including, for example, a tertiary amine or the salt thereof, a quaternary ammonium salt, and a quaternary phosphonium salt.

Examples of the tertiary amine include triethyl amine, tributyl amine, N,N-dimethylcyclohexyl amine, pyridine, and dimethyl aniline. Examples of the tertiary amine salt include a hydrochloric acid salt and a bromic acid salt of these tertiary amines.

Examples of the quaternary ammonium salt include trimethylbenzyl ammonium chloride, triethylbenzyl ammonium chloride, tributylbenzyl ammonium chloride, trioctylmethyl ammonium chloride, tetrabutyl ammonium chloride, and tetrabutyl ammonium bromide.

Examples of the quaternary phosphonium salt include tetrabutyl phosphonium chloride and tetrabutyl phosphonium bromide.

Among these, the tertiary amine is preferable, and triethyl amine is more preferable. Note that, these catalysts may be used solely or in combination of two or more kinds.

Among the above production processes, a process in which a bischloroformate represented by the following formula (16) is used as an intermediate is preferable. By using the process, with respect to bisphenol and others that are easy to crystallize when they are rendered into polycarbonate in conventional processes, monomer sequences in the polymer may be controlled widely. Therefore, a polycarbonate resin that is produced by using the bischloroformate represented by the following formula (16) as one of source chemicals exhibits good transparency, solubility, and others.

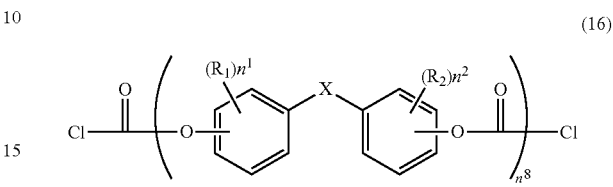

(16)

In the formula (16), each of $R^1$, $R^2$, X, $n^1$, and $n^2$ represents the same as in the formula (3); and $n^8$ represents an average number of monomeric units of a bischloroformate oligomer and the value thereof is 1.0 to 1.99.

The production process of the polycarbonate resin according to the present invention includes a process in which a monomer of the aforementioned bischloroformate or an oligomer that is composed of several monomers thereof is preliminary synthesized, and then monomers that are subsequently added are reacted. On this occasion, it is preferable that the aforementioned bischloroformate is reacted with a fluorine-containing alcohol and a siloxane source chemical beforehand. This is because, when the monomers such as the other bisphenols are simultaneously reacted, small amounts of unreacted fluoro monomers or siloxane monomers remain in the resulting resin and the performance thereof is possibly lowered, for example, transparency is possibly lowered at the time of molding.

In this way, the polycarbonate resin of the present invention that is a component of a coating solution can be obtained. The polycarbonate resin obtained in this way exhibits an excellent solvent solubility and is allowed to be dissolved stably in a non-halogen solvent.

Polycarbonate Resin Containing Coating Solution

A coating solution that contains the polycarbonate resin of the present invention includes therein the polycarbonate resin represented by the formula (1) and a non-halogen solvent.

The non-halogen solvent that is included in the coating solution of the present invention is preferably, from the viewpoint of solubility, at least one kind selected from a group consisting of aromatic solvents, ether solvents, ketone solvents, amide solvents, and ester solvents.

Examples of the aromatic solvents include toluene, xylene, anisole, trimethyl benzene, and the other aromatic high boiling point solvents (for example, commercial products such as "IPSOL (trade name, produced by Idemitsu Kosan Co., Ltd.").

Examples of the ether solvents include tetrahydrofuran, dioxane, cyclopentyl monomethylether, ethyleneglycol monomethylether acetate, propyleneglycol monomethylether acetate (PMA), diethyleneglycol monobutylether acetate, and diethyleneglycol monoethylether acetate.

Examples of the ketone solvents include cyclohexanone, methylisobutyl ketone, methylethyl ketone, and diisobutyl ketone.

Examples of the amide solvents include dimethylformamide, dimethylsulfoxide, and diethylformamide.

Examples of the ester solvents include ethyl acetate, ethyl cellosolve, methyl acetate, butyl acetate, methoxybutyl acetate, cellosolve acetate, amyl acetate, normalpropyl acetate, isopropyl acetate, methyl lactate, ethyl lactate, and butyl lactate.

These non-halogen solvent may be used solely or in combination of two or more kinds.

The solid content concentration of the coating solution according to the present invention may be adjusted appropriately in accordance with coating thickness and resin molecular weight, but preferably 1 mass % to 50 mass %, more preferable 1 mass % to 30 mass %, and still more preferably 5 mass % to 20 mass %. At a solid content concentration of 1 mass % or more, good productivity is ensured for molded articles. At a solid content concentration of 50 mass % or less, viscosity increase is suppressed and molded articles are produced without any difficulty.

Regarding the resin that is included in the coating solution, the other resins that are different from the polycarbonate resin of the present invention may be used in a mixture.

In addition, various kinds of additives may be blended into the coating solution of the present invention. Examples of the various kinds of additives include additives for resins such as dyes, coloring agents including pigments, electroconductive material, charge transport material, electron transport material, hole transport material, functional compounds such as charge generating material, inorganic or organic fillers, fibers, fillers such as fine particles, anti-oxidants, UV-light absorbing agents, light stabilizers, and oxygen trapping agents.

Molded Articles

A molded article is allowed to be fabricated by molding the polycarbonate resin containing coating solution of the present invention. The molded article of the present invention includes a cast film that is formed by molding the coating solution through a casting process and a coating film that is formed by molding the coating solution through a coating process.

Examples of the coating process of the coating solution that are used to obtain these molded articles include bar coating, dip coating, spray coating, roll coating, gravure coating, flexo coating, screen coating, spin coating, and flow coating.

Water contact angle on the surface of the molded article according to the present invention is 95 degree or more. Excellent water repellency is exhibited. The hexadecane contact angle on the surface of the molded article according to the present invention is 20 degree or more. Excellent oil repellency is exhibited. Note that, in the present invention, the contact angles of water and hexadecane were measured by the method described in examples.

Furthermore, the molded article of the present invention has excellent performances including flexibility or adherability ensuring that cracks are not easily developed and good breaking elongation. Therefore, the molded article of the present invention is preferably used for applications such as drums, rolls, belts, and electrophotographic photoreceptors.

For example, a molded article that serves as a coating layer is formed on the surface of a drum, a roll, or a belt, so that a drum, a roll, or a belt having the molded article (coating layer) is provided. The drum, roll, or belt is usable as a charging roll, a developing roll, a transfer roll, a transfer belt, and the like, for example.

Alternatively, the molded article of the present invention is used as a binder resin for an electrophotographic photoreceptor that is used for electrophotographic copy machines or printers. An electrophotographic photoreceptor having the molded article is also allowed to be provided.

Drums, rolls, belts, electrophotographic photoreceptors, and others are provided with excellent performances in accordance with each application (flexibility, water repellency, surface lubricity, abrasion resistance, transparency, and others) by including therein at least the molded article of the present invention. Note that, in the present invention, "including at least the molded article" means not only a configuration in which the molded article is partly included but also a configuration in which the molded article composes the whole portion.

Examples of the cast film or coating film applications may include phase difference films, electroconductive films, optical waveguides, inkjet coat films, anti-staining films, and film-insert molding films that are used for touch panels as a surface coat material and for cabinets or cases of cellular phones, personal computers, electric appliances, and others.

The base material that is used for producing a laminated molded article such as a coating film is not particularly limited. Examples thereof include plastic such as polyethylene terephthalate, metal such as aluminum, glass, paper, woody material, inorganic material such as stone, an electrodeposited coating plate, and a laminate board.

Among these applications, an application of using as a binder resin for an electrophotographic photoreceptor is preferable. An example of using for an electrophotographic photoreceptor is described below.

Electrophotographic Photoreceptor

A mode of the photographic photoreceptor according to the present invention includes, for example, an electrophotographic photoreceptor that has a photoreceptor layer on an electroconductive base. If necessary, between the electroconductive base and the photoreceptor layer, an underlying layer or a blocking layer that serves to block charges may be disposed. An electroconductive or insulating protection layer may be disposed on the photoreceptor layer, and, if necessary, an adhesive layer may be disposed between respective layers.

In particular, an electrophotographic photoreceptor having a photoreceptor layer that includes therein at least one charge generating layer and at least one charge transport layer, or an electrophotographic photoreceptor having a photoreceptor layer that is composed of a single layer and includes therein a charge generating chemical and a charge transport chemical is preferable. Note that, when the photoreceptor layer has two layers of the charge generating layer and charge transport layer, the charge transport layer may be laminated on the charge generating layer, or the charge generating layer may be laminated on the charge transport layer.

Note that, each layer may be coated with known coating machines. Examples of the coating machines include an applicator, a spray coater, a bar coater, a chip coater, a roll coater, a dip coater, and a doctor blade.

The polycarbonate resin of the present invention may be used in any portion of an electrophotographic photoreceptor. However, in order to exert the effect of the present invention sufficiently, the polycarbonate resin is preferably used, for example, (1) as a binder resin for the charge transport chemical in the charge transport layer, (2) as a binder resin for a single photoreceptor layer, or (3) as a resin for a surface protection layer. The polycarbonate resin of the present invention may be used in one application among the above (1) to (3) or may be used in two or more applications. Note that, in the case of a multi-layer electrophotographic photoreceptor that has two charge transport layers, it is preferable that the polycarbonate resin is used as a binder resin for at least one charge transport layer.

When an electrophotographic photoreceptor is produced by using the polycarbonate resin of the present invention, if necessary, the other resins that are different from the polycarbonate resin of the present invention may be used in a mixture. In this case, the content ratio of the polycarbonate resin according to the present invention is, with respect to the all of the resins mixed, preferably 20 mass % or more, more preferably 50 mass % or more, still more preferably 80 mass % or more, still more preferably 90 mass % or more, and still more preferably substantially 100 mass %. In addition, to the polycarbonate resin of the present invention, an additive such as an anti-oxidant may be admixed, if necessary. Hereinafter, description will be directed to each layer.

Electroconductive Base

As a material for the electroconductive base, a known one is usable. Specifically, examples thereof include: a plate, a drum, or a sheet made of aluminum, nickel, chromium, palladium, titanium, molybdenum, indium, gold, platinum, silver, copper, zinc, brass, stainless steel, lead oxide, tin oxide, indium oxide, ITO (indium tin oxide: tin doped indium oxide), or graphite; a film, a sheet, or a seamless belt made of glass, cloth, paper, or plastic that is subjected to electroconductive treatment such as vapor deposition, sputtering, and coating; and a metal drum that is subjected to metal oxidation treatment such as electrode oxidation.

Charge Generating Layer

The charge generating layer has at least a charge generating chemical. The charge generating layer may be obtained by forming a layer of the charge generating chemical on an underlying electroconductive base or the other layer through vacuum deposition or sputtering, or by forming a layer, in which the charge generating chemical is bonded with a binder resin, on an underlying electroconductive base or the other layer.

In the latter case, the content ratio (mass ratio) of the charge generating chemical to the binder resin in the charge generating layer is not particularly limited, but preferably 20/80 to 80/20 and more preferably 30/70 to 70/30.

As a method of forming the charge generating layer in which the binder resin is used, known methods may be used. However, in a favorable method, a coating solution in which the charge generating chemical is dispersed or dissolved in an appropriate solvent along with the binder resin is coated on the underlying electroconductive base or the other layer, and then dried, so that the charge generating layer is obtained in the form of a wet-process molded article.

Examples of the solvent that is used when the coating solution is prepared include: aromatic solvents such as benzene, toluene, xylene, and chlorobenzene; ketones such as acetone, methylethyl ketone, and cyclohexanone; alcohols such as methanol, ethanol, and isopropanol; esters such as ethyl acetate and ethyl cellosolve; halogenated hydrocarbons such as carbon tetrachloride, carbon tetrabromide, chloroform, dichloromethane, and tetrachloroethane; ethers such as tetrahydrofuran, dioxolan, and dioxane; dimethyl formamide; dimethyl sulfoxide; and diethyl formamide Note that, these solvents may be used solely or in a mixture of two or more kinds.

The solid content concentration of the coating solution that is used to form the charge generating layer is preferably 0.1 mass % to 30 mass % and more preferably 0.1 mass % to 20 mass %.

The thickness of the charge generating layer is preferably 0.01 μm to 2 μm and more preferably 0.1 μm to 0.8 μm. When the thickness of the charge generating layer is 0.01 μm or more, the layer may be formed easily uniformly. When 2 μm or less, electrophotographic performances are not possibly degraded.

As the charge generating chemical, a variety of known ones are usable. Specifically, examples thereof include: elemental selenium such as amorphous selenium and trigonal selenium; selenium alloys such as selenium-tellurium; selenium compounds such as $As_2Se_3$ or selenium containing compositions; zinc oxide; inorganic materials of periodic table group 12 and group 16 elements such as CdS—Se; oxide semiconductors such as titanium oxide; silicon material such as amorphous silicon; metal-free phthalocyanine pigments such as τ-type metal-free phthalocyanine and χ-type metal-free phthalocyanine; metal phthalocyanine pigments such as α-type copper phthalocyanine, β-type copper phthalocyanine, γ-type copper phthalocyanine, ε-type copper phthalocyanine, X-type copper phthalocyanine, A-type titanyl phthalocyanine, B-type titanyl phthalocyanine, C-type titanyl phthalocyanine, D-type titanyl phthalocyanine, E-type titanyl phthalocyanine, F-type titanyl phthalocyanine, G-type titanyl phthalocyanine, H-type titanyl phthalocyanine, K-type titanyl phthalocyanine, L-type titanyl phthalocyanine, M-type titanyl phthalocyanine, N-type titanyl phthalocyanine, Y-type titanyl phthalocyanine, oxotitanyl phthalocyanine, a titanyl phthalocyanine that has a strong diffraction peak of Bragg angle 2θ at 27.3±0.2 degree, and gallium phthalocyanine; cyanine dyes; anthracene pigments; bisazo pigments; pyrene pigments; polycyclic quinone pigments; quinacridone pigments; indigo pigments; perylene pigments: pyrylium dyes; squarylium pigments; anthanthron pigments; benzimidazole pigments; azo pigments: thioindigo pigments; quinoline pigments; lake pigments; oxazine pigments: dioxazine pigments; triphenylmethane pigments; azulenium dyes; triarylmethane dyes; xanthine dyes; thiazine dyes; thiapyrylium dyes; polyvinyl carbazole; and bisbenzimidazole pigments. Note that, these charge generating chemicals may be used solely or in combination of two or more kinds. Among these, a charge generating chemical that is represented by any of the following formulas of (i) to (iii) is preferable.

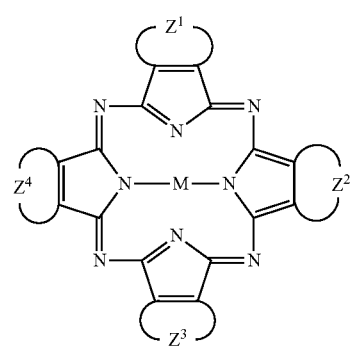

(i)

In the formula (i), each of $Z^1$ to $Z^4$ represents, independently from each other, an atomic group that is capable of forming, along with two carbon atoms attached to a pyrrole ring, an aromatic hydrocarbon ring or heterocyclic ring that may have a substitution group; and M represents a metal atom or a metal compound that may have two hydrogen atoms or ligands.

(ii)

In the formula (ii), $Ar^1$ represents a t-valent residue having a conjugated system that may have an aromatic hydrocarbon ring or a heterocyclic ring; t represents an integer of 1 or more; and Cp represents a coupler residue having an aromatic hydroxy group. Note that, when t is 2 or more, each Cp may be the same or different from each other.

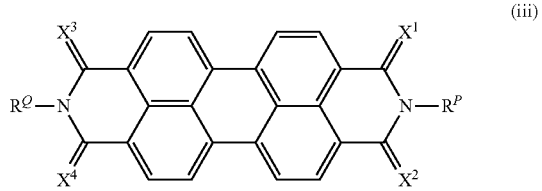

(iii)

In the formula (iii), each of $X^1$ to $X^4$ represents, independently from each other, an oxygen atom, a sulfur atom, and a selenium atom; each of $R^P$ and $R^Q$ represents an alkyl or aryl group having 1 to 12 carbon atoms; and a combination of $X^1$ or $X^2$ and $R^P$ or a combination of $X^3$ or $X^4$ and $R^Q$ may form a hetero ring that may have a substitution group.

The binder resin that is used for the charge generating layer is not particularly limited, but a variety of known ones are usable. Specifically, examples thereof include polystyrene, polyvinyl chloride, polyvinyl acetate, a copolymer of vinyl chloride and vinyl acetate, polyvinyl acetal, alkyd resin, acrylic resin, polyacrylonitrile, polycarbonate, polyurethane, epoxy resin, phenol resin, polyamide, polyketone, polyacrylamide, butyral resin, polyester resin, a copolymer of vinylidene chloride and vinyl chloride, methacrylic resin, a copolymer of styrene and butadiene, a copolymer of vinylidene chloride and acrylonitrile, a copolymer of vinyl chloride, vinyl acetate and maleic anhydride, silicone resin, silicone-alkyd resin, phenol-formaldehyde resin, styrene-alkyd resin, melamine resin, polyether resin, benzoguanamine resin, epoxy acrylate resin, urethane acrylate resin, poly-N-vinylcarbazole, polyvinyl butyral, polyvinyl formal, polysulfone, casein, gelatin, polyvinyl alcohol, ethyl cellulose, nitro cellulose, carboxy-methyl cellulose, vinylidene chloride polymer latex, a copolymer of acrylonitrile and butadiene, a copolymer of vinyl toluene and styrene, soybean oil denatured alkyd resin, nitrated polystyrene, polymethyl styrene, polyisoprene, polythiocarbonate, polyarylate, polyhaloarylate, polyallyl ether, polyvinyl acrylate, and polyester acrylate. These binder resins may be used solely or in a mixture of two or more kinds. In addition, as the binder resin, the polycarbonate resin of the present invention may be also used solely or in combination with the above binder resins.

Charge Transport Layer

The charge transport layer may be obtained in the form of a wet-process molded article by way of forming a layer in which a charge transport chemical is bonded with a binder resin on an underlying electroconductive base or the other layer.

As a method of forming the charge transport layer, a variety of known processes are usable. For example, in a preferable process, a coating solution in which the charge transport chemical is dispersed or dissolved along with a polycarbonate resin mixture in an appropriate solvent is coated on a given underlying electroconductive base or the other layer, and then dried to obtain the charge transport layer in the form of a wet-process molded article.

The content ratio (mass ratio) of the charge transport chemical to the binder resin [(charge transport chemical):(binder resin)] in the charge transport layer is preferably 10:90 to 80:20, more preferably 20:80 to 80:20, and still more preferably 30:70 to 70:30. Note that, the binder resin may include therein the polycarbonate resin of the present invention, or the whole of the binder resin may be the polycarbonate resin of the present invention.

As the solvent that is used when the coating solution is prepared, the same solvent that is used in the preparation of the charge generating layer may be listed, but ether is preferable, and tetrahydrofuran is more preferable.

The solid content concentration of the coating solution that is used for forming the charge transport layer is preferably 0.1 mass % to 30 mass % and more preferably 0.1 mass % to 20 mass %.

The thickness of the charge transport layer is preferably 5 μm to 100 μm and more preferably 10 μm to 30 μm. When the thickness of the charge transport layer is 5 μm or more, there is no possibility of lowering in initial potential. When 100 μm or less, good electrophotographic performances are obtained.

As the charge transport chemical, a variety of known compounds are usable. Examples thereof include carbazole compounds, indole compounds, imidazole compounds, oxazole compounds, pyrazole compounds, oxadiazole compounds, pyrazoline compounds, thiadiazole compounds, aniline compounds, hydrazone compounds, aromatic amine compounds, aliphatic amine compounds, stilbene compounds, fluorenone compounds, butadiene compounds, enamine compounds, quinone compounds, quinodimethane compounds, thiazole compounds, triazole compounds, imidazolone compounds, imidazolidine compounds, bisimidazolidine compounds, oxazolone compounds, benzothiazole compounds, benzimidazole compounds, quinazoline compounds, benzofran compounds, acridine compounds, phenazine compounds, poly-N-vinylcarbazole, polyvinyl pyrene, polyvinyl anthracene, polyvinyl acridine, poly-9-vinylphenyl anthracene, pyrene-formaldehyde resin, ethylcarbazole resin, or a polymer that has these structures on the main or side chains thereof. Note that, these charge transport chemicals may be used solely or in combination of two or more kinds.

Among these charge transport chemicals, the compounds that are exemplified in the paragraphs [0121] to [0166] of Japanese Patent Laid-Open Publication No. H11-172003, and the charge transport chemicals that are represented by the following structures are preferable.

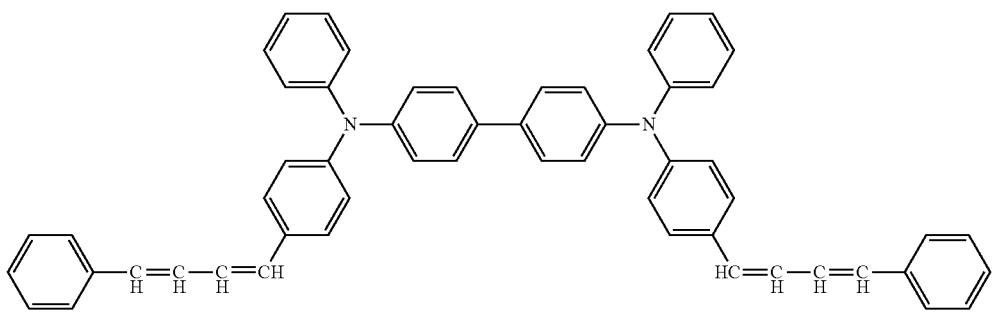

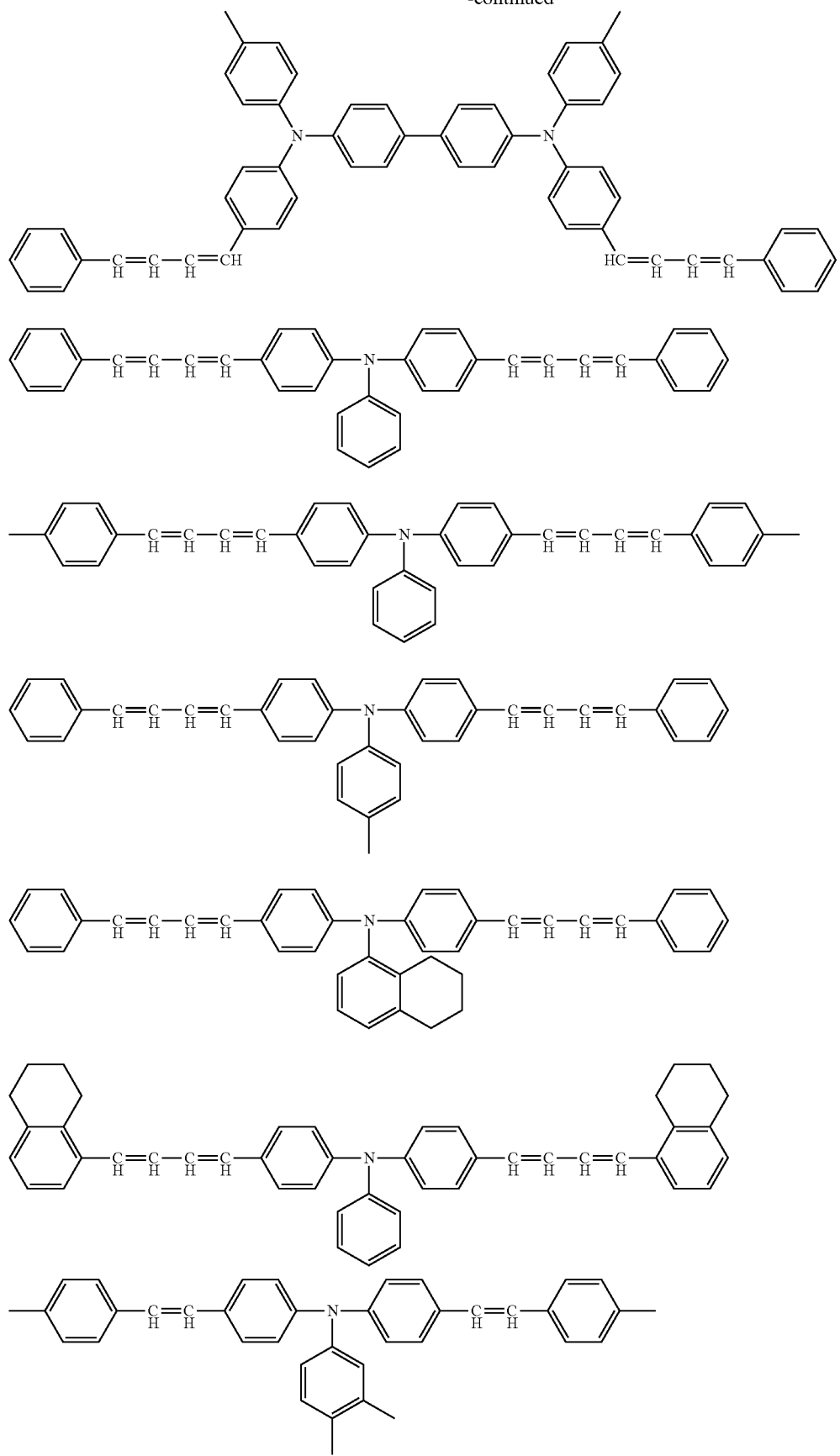

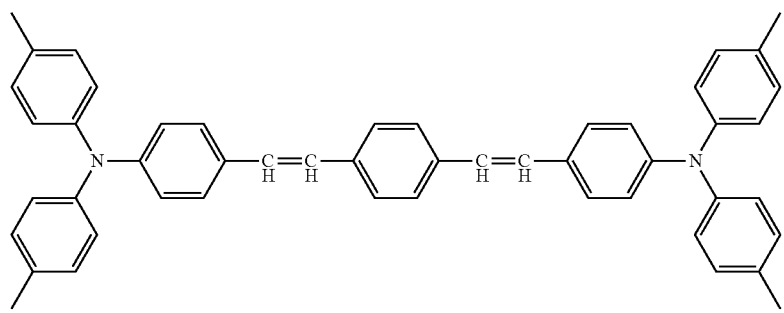
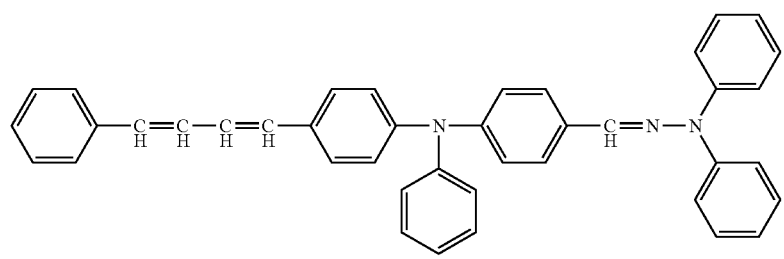
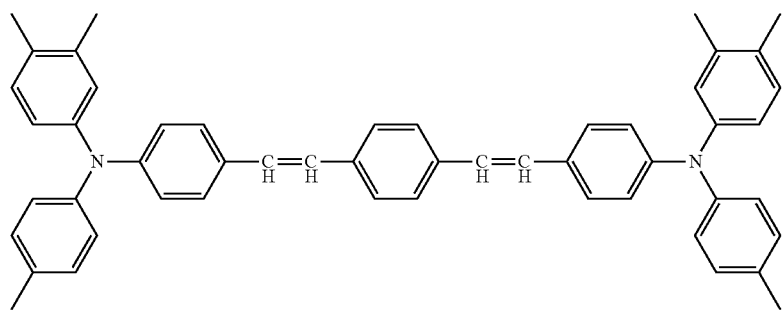
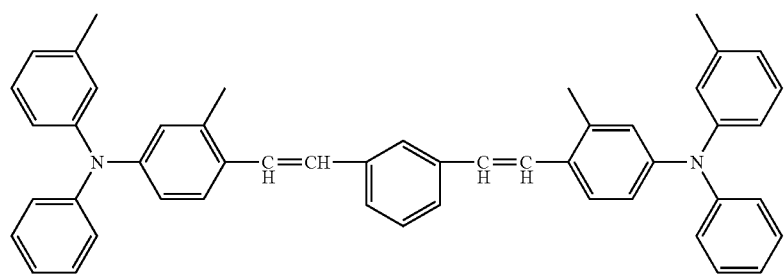
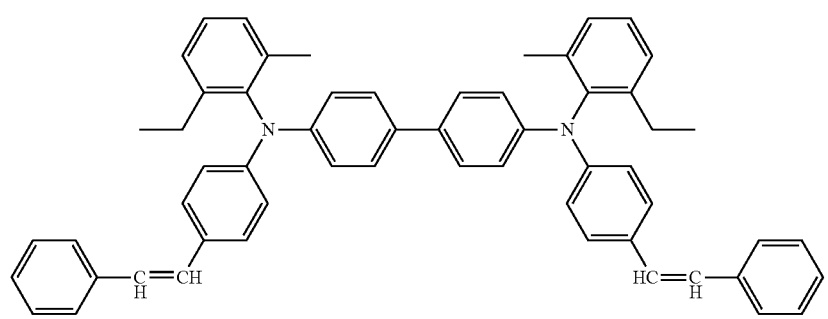

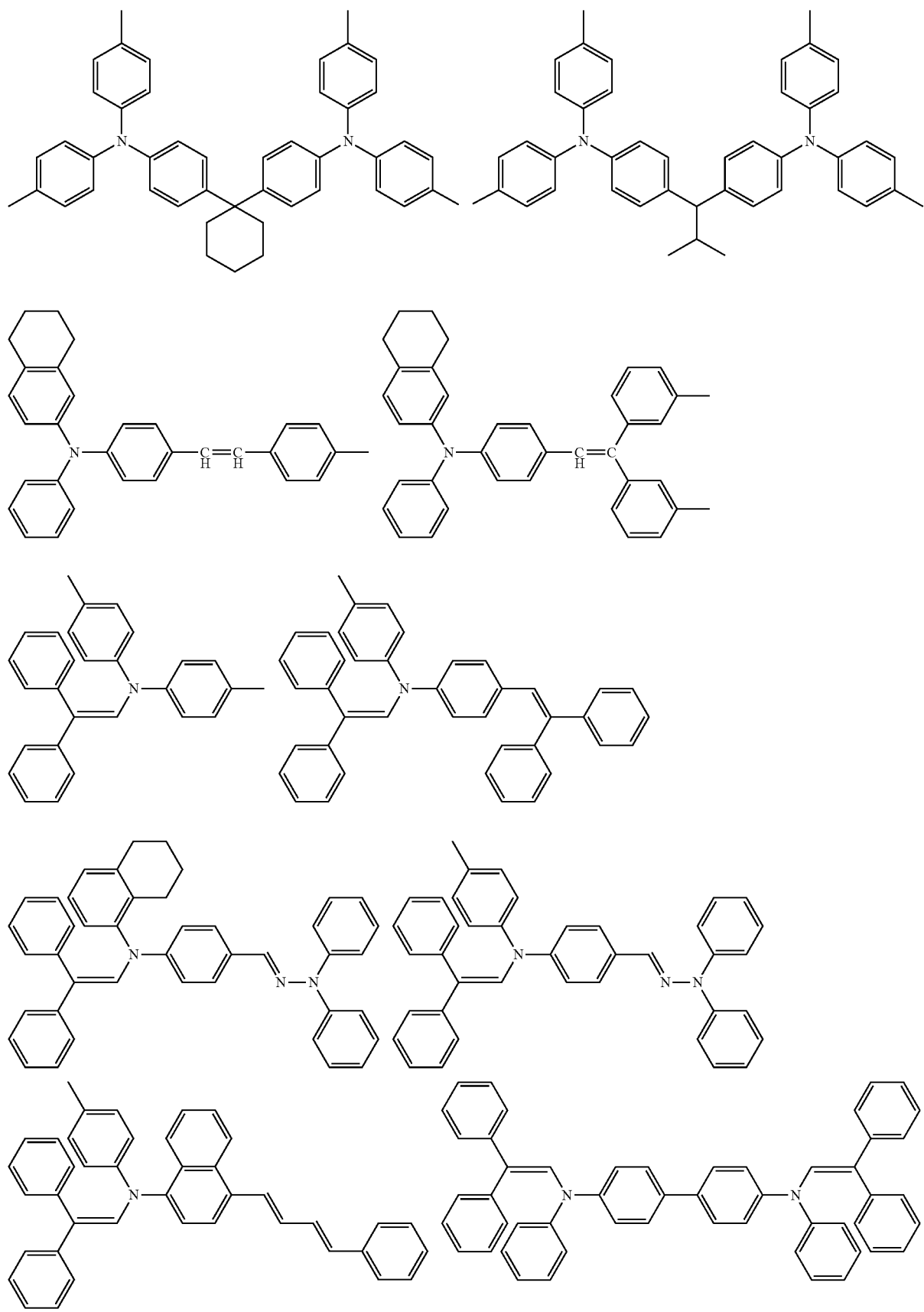

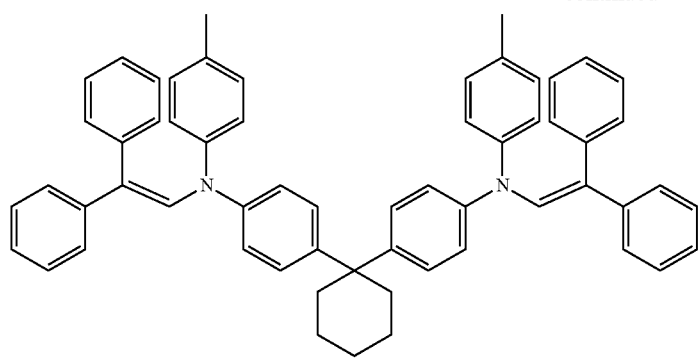
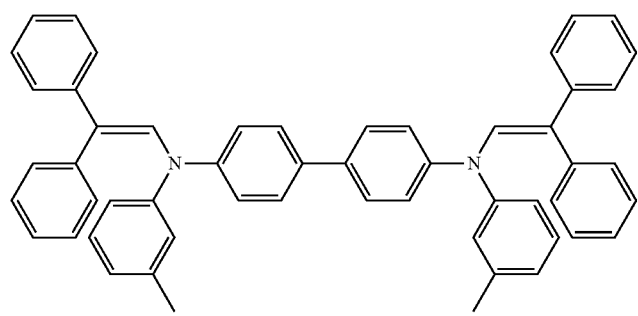
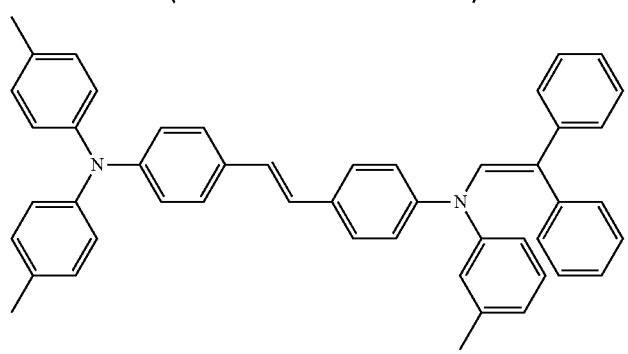
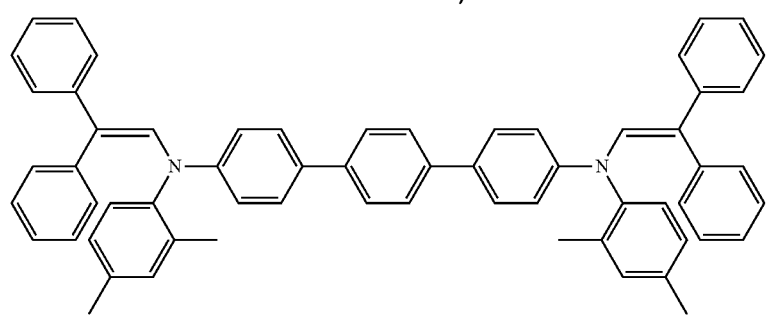
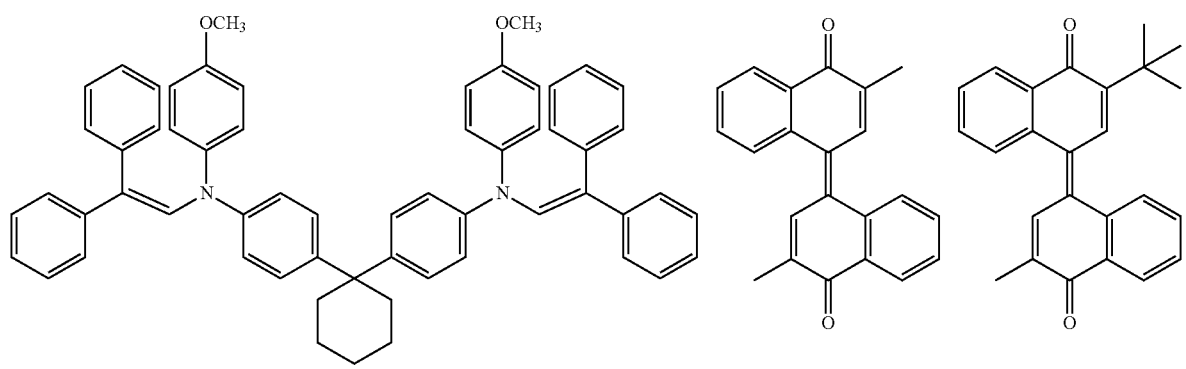

-continued
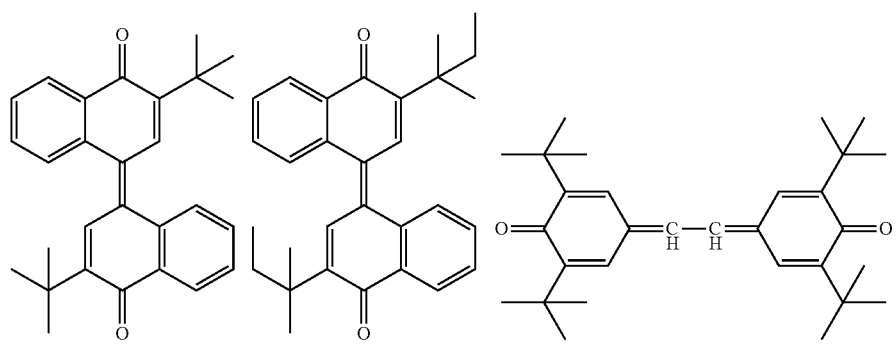
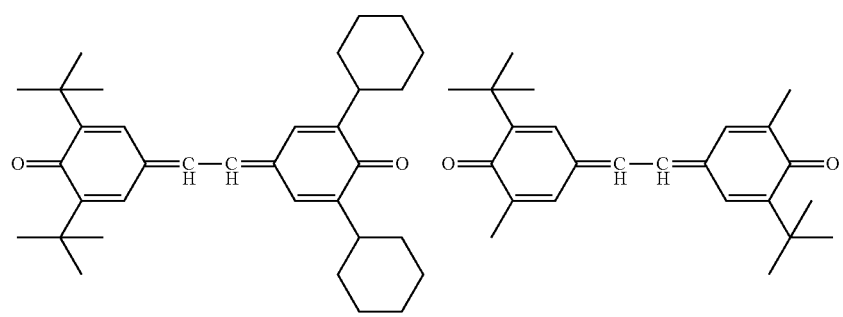
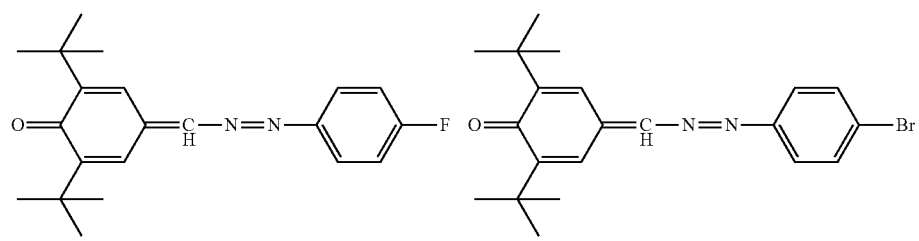
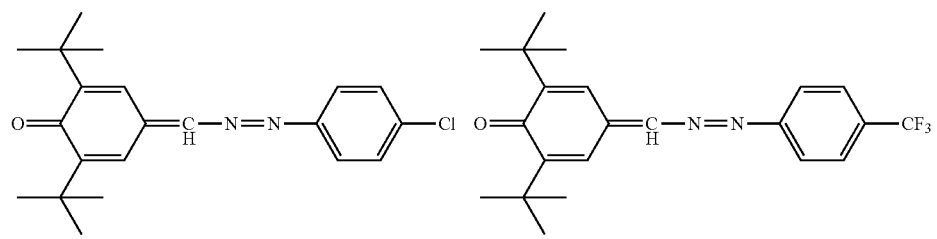
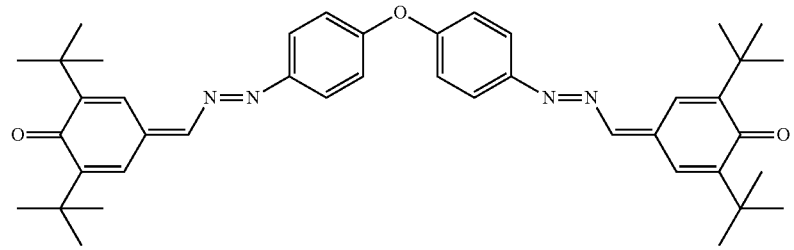
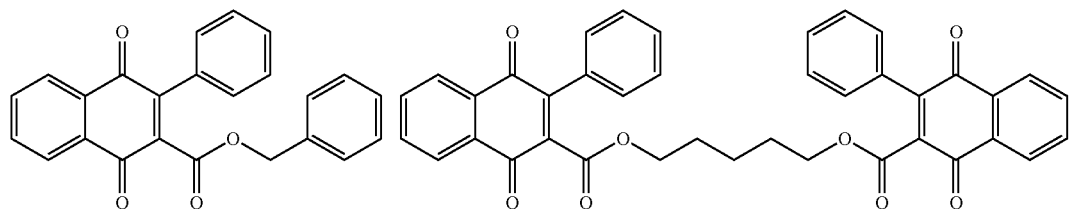

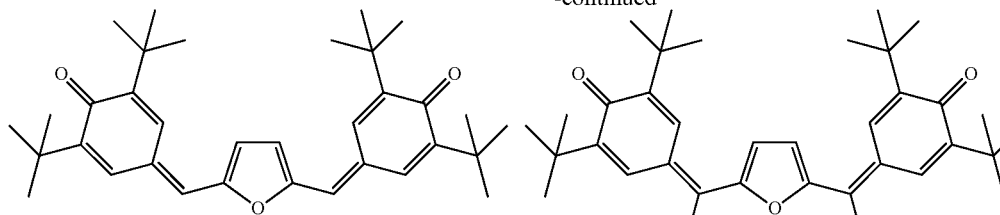

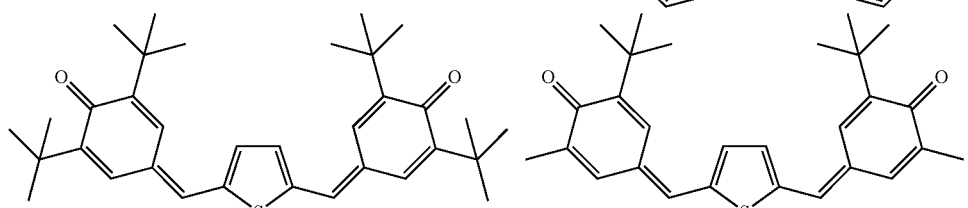

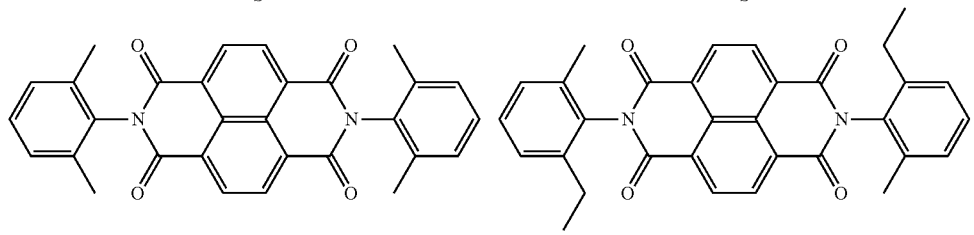

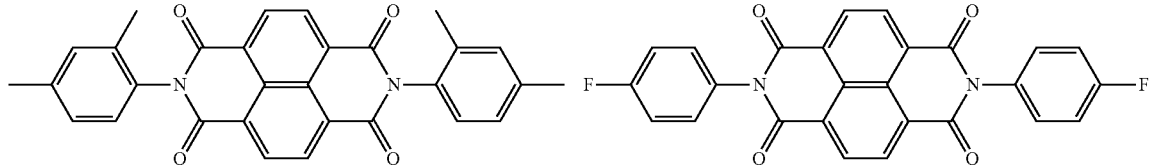

The binder resin used for the charge transport layer is not particularly limited. Known resins besides the polycarbonate resin of the present invention are also usable. As the known binder resins, the same ones as the resins that are used in the aforementioned charge generating layer may be listed. Note that, the binder resins may be used solely or in a mixture of two or more kinds.

In particular, as the binder resin in the charge transport layer, the polycarbonate resin of the present invention is preferably used. When the polycarbonate resin of the present invention is used as the binder resin in the charge transport layer, the polycarbonate resin of the present invention may be solely used as the binder resin, or may be used in a mixture with the other binder resins.

The content ratio of the polycarbonate resin mixture of the present invention with respect to the total binder resins is preferably 20 mass % to 100 mass %, more preferably 50 mass % to 100 mass %, more preferably 80 mass % to 100 mass %, still more preferably 90 mass % to 100 mass %, and still more preferably substantially 100 mass %.

Note that, in an electrophotographic photoreceptor, the polycarbonate resin of the present invention is preferably used as a binder resin in at least one of the charge generating layer and the charge transport layer.

Underlying Layer

In an electrophotographic photoreceptor, between the electroconductive base and the photoreceptor layer, an underlying layer such as the one that is conventionally used may be disposed.

Examples of the material for the underlying layer include: inorganic fine particles such as titanium oxide, aluminum oxide, zirconia, titanic acid, zirconic acid, lead lanthamun, titanium black, silica, lead titanate, barium titanate, tin oxide, indium oxide, and silicon oxide; and resins such as polyamide resin, phenol resin, casein, melamine resin, benzoguanamine resin, polyurethane resin, epoxy resin, cellulose, nitrocellulose, polyvinyl alcohol, and polyvinyl butyral resin. In addition, as the resin that is used for the underlying layer, the binder resin that is usable for the charge generating layer or the charge transport layer may be used. The polycarbonate resin of the present invention may be also used. These inorganic fine particles or reins may be used solely or in a mixture of two or more kinds. In the case of using a mixture of two or more kinds, from the viewpoint of forming a film having good smoothness, preferably, the inorganic fine particles and the resins are used in combination.

In the case of including the underlying layer, the thickness of the underlying layer is preferably 0.01 μm to 10 μm and more preferably 0.1 μm to 7 μm. When the thickness of the underlying layer is 0.01 μm or more, the underlying layer is formed uniformly easily. When 10 μm or less, good electrophotographic performances are obtained.

Blocking Layer

Between the electroconductive base and the photoreceptor layer, a known blocking layer such as the one that is conventionally used may be disposed. As the binder resin that is used for the blocking layer, a binder resin that is usable for the charge generating layer or the charge transport layer may be used. The polycarbonate resin of the present invention may be also used.

In the case of including the blocking layer, the thickness of the blocking layer is preferably 0.01 µm to 20 µm and more preferably 0.1 µm to 10 µm. When the thickness of the blocking layer is 0.01 µm or more, the blocking layer is formed uniformly easily. When 20 µm or less, good electrophotographic performances are obtained.

Protection Layer

In addition, in the photographic photoreceptor, on the photoreceptor layer, a protection layer may be disposed. For the protection layer, a binder resin that is usable for the charge generating layer or the charge transport layer may be used. The polycarbonate resin of the present invention may be also used.

In the case of including the protection layer on the photoreceptor layer, the thickness of the protection layer is preferably 0.01 µm to 20 µm and more preferably 0.1 µm to 10 µm. Note that, in the protection layer, the charge generating chemical, the charge transport chemical, additives, metal or the oxides thereof, nitrides, salts, alloys, carbon black, and an electroconductive material such as an organic electroconductive compound may be included.

Various Kinds of Additives

Additionally, in order to improve the performances of the electrophotographic photoreceptor, a binder, a plasticizer, a curing catalyst, a fluidity-imparting agent, a pinhole-regulating agent, a spectral sensitizer (sensitizing dye), and others may be added to the photoreceptor layer. In addition, in order to prevent increase in residual potential, lowering in charging potential, and sensitivity degradation upon repeated use, various kinds of chemicals, for example, additives such as an antioxidant, a surfactant, an anti-curing agent, and a leveling agent may be added.

Examples of the binder include silicone resin, polyamide resin, polyurethane resin, polyester resin, epoxy resin, polyketone resin, polycarbonate resin, polystyrene resin, polymethacrylate resin, polyacrylamide resin, polybutadiene resin, polyisoprene resin, melamine resin, benzoguanamine resin, polychloroprene resin, polyacrylonitrile resin, ethyl cellulose resin, nitrocellulose resin, urea resin, phenol resin, phenoxy resin, polyvinyl butyral resin, formal resin, vinyl acetate resin, a copolymer resin of vinyl acetate and vinyl chloride, and polyester carbonate resin. Furthermore, thermosetting and/or light-curing resins are usable. In any way, a resin that is electrical insulating and is capable of forming a film under normal conditions is not particularly limited as far as the effect of the present invention is not impaired.

Examples of the plasticizer include biphenyl, biphenyl chloride, o-ter-phenyl, halogenated paraffin, dimethyl naphthalene, dimethyl phthalate, dibutyl phthalate, dioctyl phthalate, diethyleneglycol phthalate, triphenyl phosphate, diisobutyl adipate, dimethyl sebacate, dibutyl sebacate, butyl laurate, methylphthalyl ethyl glycolate, dimethylglycol phthalate, methyl naphthalene, benzophenone, polypropylene, polystyrene, and fluoro hydrocarbon.

Examples of the curing catalyst include methane sulfonic acid, dodecylbenzene sulfonic acid, and dinonylnaphthalene disulfonic acid.

Examples of the fluidity-imparting agent include MODAFLOW and ACRONAL 4F.

Examples of the pinhole-regulating agent include benzoin and dimethyl phthalate.

Each content of the above plasticizer, curing catalyst, fluidity-imparting agent, and pinhole-regulating agent is, with respect to 100 parts by mass of the charge transport chemical, preferably 5 parts by mass or less and more preferably 3 parts by mass or less.

Furthermore, regarding the spectral sensitizer, when a sensitizing dye is used, preferable examples thereof include: triphenyl methane dyes such as Methyl Violet, Crystal Violet, Night Blue, and Victoria Blue; acridine dyes such as Erythrosine, Rhodamine B, Rhodamine 3R, Acridine Orange, and Frapeocine; thiazine dyes such as Methylene Blue and Methylene Green; oxazine dyes such as Capri Blue and Meldora Blue; cyanine dyes; merocyanine dyes; styryl dyes; pyrylium salt dyes; and thiopyrylium salt dyes.

The content of the spectral sensitizer is, with respect to 100 parts by mass of the charge transport chemical, preferably 5 parts by mass or less and more preferably 3 parts by mass or less.

Preferable examples of the antioxidant include hindered phenol antioxidants, aromatic amine antioxidants, hindered amine antioxidants, sulfide antioxidants, and organic phosphoric acid antioxidants. Specific examples of these antioxidants include the compounds that are represented by the formulas ([chemical 94] to [chemical 101]) described in Japanese Patent Laid-Open Publication No. H11-172003. Note that, these antioxidants may be used solely or in combination of two or more kinds.

When the photoreceptor includes therein the antioxidant, the content of the antioxidant is, with respect to 100 parts by mass of the charge transport chemical, preferably 0.01 part by mass to 10 parts by mass and more preferably 0.1 part by mass to 2 parts by mass. In addition, the antioxidant, besides in the photoreceptor layer, may be included in the underlying layer, blocking layer, or surface protection layer.

In the photoreceptor layer, from the viewpoint of improving sensitivity, decreasing residual potential, reducing fatigue upon repeated use, and others, an electron accepting chemical is preferably added.

Examples of the electron accepting chemical include a compound that has a large electron affinity such as succinic anhydride, maleic anhydride, dibromomaleic anhydride, phthalic anhydride, tetrachlorophthalic anhydride, tetrabromophthalic anhydride, 3-nitrophthalic anhydride, 4-nitrophthalic anhydride, pyromellitic anhydride, mellitic anhydride, tetracyanoethylene, tetracyanoquinodimethane, o-dinitrobenzene, m-dinitrobenzene, 1,3,5-trinitrobenzene, p-nitrobenzonitrile, picryl chloride, quinone chloroimide, chloranil, bromanil, benzoquinone, 2,3-dichlorobenzoquinone, dichlorodicyano parabenzoquinone, naphtoquinone, diphenoquinone, tropoquinone, anthraquinone, 1-chloroanthraquinone, dinitroanthraquinone, 4-nitrobenzophenone, 4,4'-dinitrobenzophenone, 4-nitrobenzalmalon dinitrile, α-cyano-β-(p-cyanophenyl)ethyl acrylate, 9-anthracenylmethylmalon dinitrile, 1-cyano-(p-nitrophenyl)-2-(p-chlorophenyl)ethylene, 2,7-dinitrofluorenone, 2,4,7-trinitrofluorenone, 2,4,5,7-tetranitrofluorenone, 9-fluorenylidene-(dicyanomethylene malononitrile), polynitro-9-fluorenylidene-(dicyanomethylene malonodinitrile), picric acid, o-nitrobenzoic acid, p-nitrobenzoic acid, 3,5-dinitrobenzoic acid, pentafluorobenzoic acid, 5-nitrosalycilic acid, 3,5-dinitrosalycilic acid, phthalic acid, and mellitic acid.

The electron accepting chemical may be included any of the charge generating layer and the charge transport layer in the photoreceptor layer.

When the photoreceptor layer includes therein the electron accepting chemical, the content of the electron accepting chemical is, with respect to 100 parts by mass of the charge generating chemical or the charge transport chemical, preferably 0.01 part by mass to 200 parts by mass and more preferably 0.1 part by mass to 50 parts by mass.

In addition, the photoreceptor layer may include therein a surface modifier, from the view point of improving surface properties.

Examples of the surface modifier include tetrafluoroethylene resin, trifluorochloro-ethylene resin, tetrafluoroethylene hexafluoropropylene resin, vinyl fluoride resin, vinylidene fluoride resin, difluorodichloro-ethylene resin and a copolymer thereof, and a fluoro graft polymer.

When the photoreceptor layer includes therein the surface modifier, the content of the surface modifier is, with respect to 100 parts by mass of the binder resin, preferably 0.1 part by mass to 60 parts by mass and more preferably 5 parts by mass to 40 parts by mass. When the content is 0.1 part by mass or more, sufficient surface modification including surface durability and surface energy reduction is assured. When the content is 60 parts by mass or less, electrophotographic performances are not possibly degraded.

The photoreceptor layer of the electrophotographic photoreceptor are easily formed by using the aforementioned charge generating chemical, charge transport chemical, additives, and others.

The thickness of the photoreceptor layer in the electrophotographic photoreceptor is preferably 5 μm to 100 μm and more preferably 8 μm to 50 μm. When the thickness of the photoreceptor layer is 5 μm or more, a high initial potential is easy to attain. When 100 μm or less, good electrophotographic performances are attained.

The electrophotographic photoreceptor, which is obtained as described above, in which the polycarbonate resin of the present invention is used, is characterized in that, when the photoreceptor layer includes therein the polycarbonate resin, the coating solution hardly becomes cloudy and gelled in the course of preparing the photoreceptor layer. In addition, along with excellent transparency and abrasion resistance (durability), excellent electrophotographic performances are attained. The excellent electrophotographic performances are allowed to be kept over a long time.

Note that, when the electrophotographic photoreceptor is used, corona discharging (corotron or scorotron), contact electrification (charging rolls or charging brushes), and others are used for charging. For light exposure, any of halogen lamps or fluorescent lamps, laser (semiconductor or He—Ne), LED, and exposure from the inside of the photoreceptor may be employed. For development, dry-process development or wet-process development is used, which includes cascade development, two component magnetic brush development, one component insulating toner development, and one component conductive toner development. For transferring, electrostatic transfer processes such as corona transfer, roller transfer and belt transfer, pressure transfer processes, and adhesive transfer processes are used. For fixing, heat roller fixing, radiant flash fixing, oven fixing, pressure fixing, or the like is used. Furthermore, for cleaning and neutralization, a brush cleaner, a magnetic brush cleaner, an electrostatic brush cleaner, a magnetic roller cleaner, a blade cleaner, a cleaner abbreviated device, and others are used. As a resin for toners, styrene resin, styrene-acryl copolymer resin, polyester, epoxy resin, cyclic hydrocarbon polymer, and others are applicable. The form of the toner may be spherical or amorphous. The toner that is regulated in a given form (spheroidal, potato form, and the like) is also applicable. The toner may be any of a pulverized type, a suspension polymerization toner, an emulsion polymerization toner, a chemically granulated toner, or an ester elongation polymerized toner.

EXAMPLES

The present invention will be further specifically described in detail with reference to the following examples, but it should be construed that the present invention is in no way limited to those examples.

Note that, the reduced viscosity, chemical structure, and copolymer composition of polycarbonate resins that are obtained in each example, and the properties of films that are obtained in each example were measured in accordance with the following methods.

(1) Reduced Viscosity [$\eta_{SP}/C$]

A solution of polycarbonate resin (solvent: methylene chloride, concentration: 0.5 g/dl) was prepared. The reduced viscosity thereof [$\eta_{SP}/C$] was measured at 20° C. For the reduced viscosity measurement, an automatic kinematic viscosity tester "VMR-052USPC" (model name, manufactured by RIGO Corp.) was used. The measurement was performed with an Ubbelohde modified viscometer (type: RM) designed for the automatic viscosity tester.

(2) Chemical Structure and Copolymerization Composition The chemical structure and copolymer composition of the polycarbonate resins were determined by using a proton nuclear magnetic resonance spectrometer ($^1$H-NMR) ("JNM-AL400" (model name, manufacture by JEOL Ltd.).

(3) Haze Measurement

By using a measurement apparatus of "NDH5000" of Nippon Denshoku Industries Co., Ltd., measurement was performed in accordance with JIS K7136.

(4) Contact Angle to Water and Hexadecane

By using a contact angle meter ("DM700" (model name, manufactured by Kyowa Interface Science Co., Ltd.), contact angles to water and hexadecane were measured. Note that, as the contact angles to water and hexadecane are larger, water repellency and oil repellency of the surface are indicated to be higher.

(5) Friction Coefficient Measurement

By using a surface property tester "HEIDON TYPE14DR" (model name, manufactured by SHINTO Scientific Co., Ltd.) and a steel ball as a measurement indenter, at a load of 50 g, static friction coefficient and dynamic friction coefficient were measured.

(6) Abrasion Resistance (Durability) Evaluation

A. Suga Abrasion Test

The abrasion resistance of the cast face of a film sample obtained was evaluated with a Suga Abrasion Tester "type: NUS-ISO-3" (model name, manufacture by Suga Test Instruments Co., Ltd.). Evaluation was performed under test conditions: using a 3 μm sand paper, at a load of 500 g, 2000 times abrasion was performed. The weight loss of the film sample was measured, which was used as a durability index.

B. Taber Abrasion Test

The abrasion resistance of the cast face of a film sample obtained was evaluated with a Taber abrasion tester "Rotary Abrasion Tester TS" (model name, manufactured by Toyo Seiki Corp.). Evaluation was performed under test conditions: using an abrasion ring CS-10F, at a load of 500 g, 500 times rotation was performed. The weight loss of the film sample was measured, which was used as a durability index.

Example 1

Synthesis of Polycarbonate Resin (A-1)

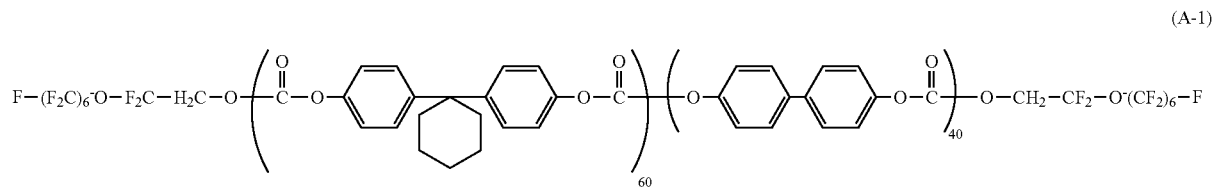

(A-1)

1. Synthesis of Bisphenol Z Bischloroformate 1,1-Bis(4-hydroxyphenyl)cyclohexane (bisphenol Z) in an amount of 73.0 g (0.272 mol) was suspended in 410 mL of methylene chloride; and 55.3 g (0.546 mol) of triethyl amine were added thereto and dissolved. The resulting solution was dropped to a solution dissolving 54.5 g (0.551 mol) of phosgene in 225 mL of methylene chloride at 14° C. to 18.5° C. over 2 hours and 50 minutes. After 1 hour agitation at 18.5° C. to 19° C., 250 mL of methylene chloride were distilled out at 10° C. to 22° C. To the resulting residual liquid, 73 mL of pure water, 4.5 mL of concentrated hydrochloric acid and 0.47 g of hydrosulfite were added so as to wash the residual liquid. After that, with 330 mL of pure water, washing was repeated four times so as to obtain a methylene chloride solution of bisphenol Z bischloroformate that had a chloroformate group on the molecular end thereof. The chloroformate concentration of the resulting solution was 1.1 mol/L. The solid content concentration was 0.22 kg/L. The average number of monomeric units was 1.1.

Note that, the average number (n') of monomeric units was evaluated by using the following equation.

Average number ($n'$) of monomeric units=$1+(M_{av}-M^1)/M^2$

In the above equation, Mav represents 2×1000/CF valence [CF valence (N/kg)=CF value/concentration, CF value (N)=the number of chloro molecules contained in the bischloroformate compound that is represented by the following formula (a). Concentration (kg/L)=the amount of solid content obtained by concentrating 1 L of reaction solution.]. $M^1$ represents the molecular weight of the bischloroformate compound when n=1 in the following formula (a). $M^2$ represents $M^1$-98.92 (98.92 is the total atomic weight of two chlorine atoms, one oxygen atom, and one carbon atom that are eliminated when the bischloroformate compound is polycondensated with each other.

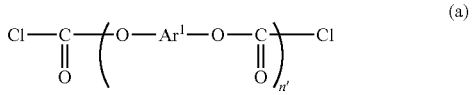

(a)

In the formula (a), $Ar^1$ represents a bisphenol compound or a portion that forms a bisphenol compound or biphenol compound except a hydroxyl group.

2. Synthesis of Polycarbonate Resin (A-1)

To a reactor, a mechanical stirrer, an agitation propeller, and a baffle plate were attached, and the bisphenol Z bischloroformate (24 mL) synthesized above and methylene chloride (36 mL) were introduced. As an end-terminator, 2,2-difluoro-2-(perfluorohexyloxy) ethanol in an amount of 0.13 g was added thereto. Agitation was performed so as to attain sufficient mixing.

To the resulting solution, about 7 mL of a biphenol monomer solution that was prepared separately (the solution was obtained as: 10 mL of a 2N sodium hydroxide aqueous solution were prepared, which was then cooled below room temperature; and then 0.1 g of hydrosulfite serving as an antioxidant and 2.6 g of 4,4'-biphenol were added and dissolved thoroughly) were added. After the inside of the reactor was cooled to 15° C., 0.2 mL of a triethylamine aqueous solution (7 volume %) was added while agitating. Agitation was continued for 15 minutes. After that, the remaining biphenol monomer solution was introduced, and agitation was further continued for 1 hour.

The resulting reaction mixture was diluted with 0.2 L of methylene chloride and 0.1 L of water so as to be washed. The resulting lower layer was separated and further washed successively with 0.1 L of water once, 0.1 L of 0.03 N hydrochloric acid once, and 0.1 L of water 5 times. The resulting methylene chloride solution was dropped into a mixed solution of water and 2-propanol (3:2 by volume ratio) that was heated at about 70° C., while agitated, so that methylene chloride was vaporized and a resinous solid content was obtained. The resulting resinous solid content was filtered off and dried, so that the polycarbonate resin (A-1) having the above structure was produced.

The reduced viscosity [$\eta_{SP}/C$] of thus obtained polycarbonate resin (A-1) was 1.1 dl/g. By NMR analysis, the polycarbonate resin (A-1) was confirmed to have the above repeating unit and composition.

Example 2

Synthesis of Polycarbonate Resin (A-2)

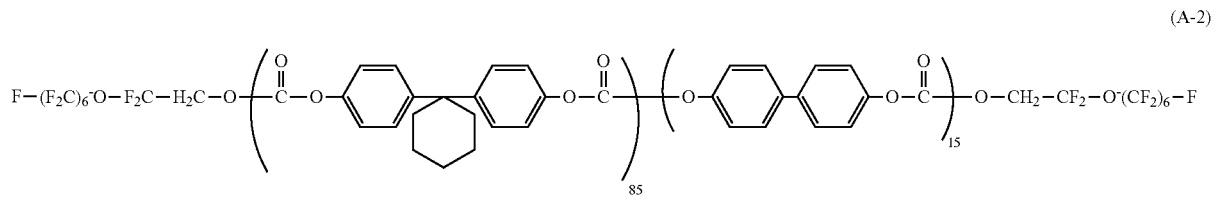

(A-2)

1. Synthesis of Bisphenol Z Bischloroformate Oligomer

A solution that dissolved 0.2 kg of 1,1-bis(4-hydroxyphenyl)cyclohexane (bisphenol Z) in 1.2 kg of a 16 mass % potassium hydroxide aqueous solution was mixed with 1.4 kg of methylene chloride. While the resulting solution was agitated and cooled, phosgene gas was blown into the solution at a rate of 1 L/minute until the pH reached 9 or less. Then, the reaction solution was stood still so as to be separated. In the resulting organic layer, a methylene chloride solution of bisphenol Z bischloroformate oligomer that had a polymerization degree of 2 to 6 and a chloroformate group on the molecular end thereof was obtained. The solution thus obtained had a chloroformate concentration of 0.41 mol/L and a solid content concentration of 0.20 kg/L.

2. Synthesis of Polycarbonate Resin (A-2)

Then, 349 ml of the above bisphenol Z bischloroformate oligomer solution were dissolved in 112 ml of methylene chloride. Furthermore, after 3.5 g of 2,2-difluoro-2-(perfluorohexyloxy)ethanol that served as an end-terminator were added, 38 ml of a 2 mol/L sodium hydroxide aqueous solution were added, and 0.5 ml of a 7 mass % triethylamine aqueous solution that served as a catalyst was added. After 15 minute vigorous agitation, to the resulting solution, a solution that dissolved 8.8 g of 4,4'-biphenol in 90 ml of a 2 mol/L sodium hydroxide aqueous solution was added. Then, while the resulting mixed solution was vigorously agitated, 1.0 ml of the 7 mass % triethylamine aqueous solution that served as a catalyst was further added. At 15° C. with agitation, reaction was performed for 1.5 hours. After the reaction terminated, the resulting reaction product was diluted with 1000 ml of methylene chloride, and then washed with 200 ml of water twice, 200 ml of 0.01 mol/L hydrochloric acid once, further 200 mL of water twice successively. Similarly to example 1, the resulting organic layer was dropped into a mixed solution of water and 2-propanol (3:2 by volume ratio) that was heated at about 70° C. so as to obtain the above polycarbonate resin (A-2).

The reduced viscosity [$\eta_{SP}/C$] of thus obtained polycarbonate resin (A-2) was 0.6 dl/g. By NMR analysis, the polycarbonate resin (A-2) was confirmed to have the above repeating unit and composition.

Example 3

Synthesis of Polycarbonate Resin (A-3)

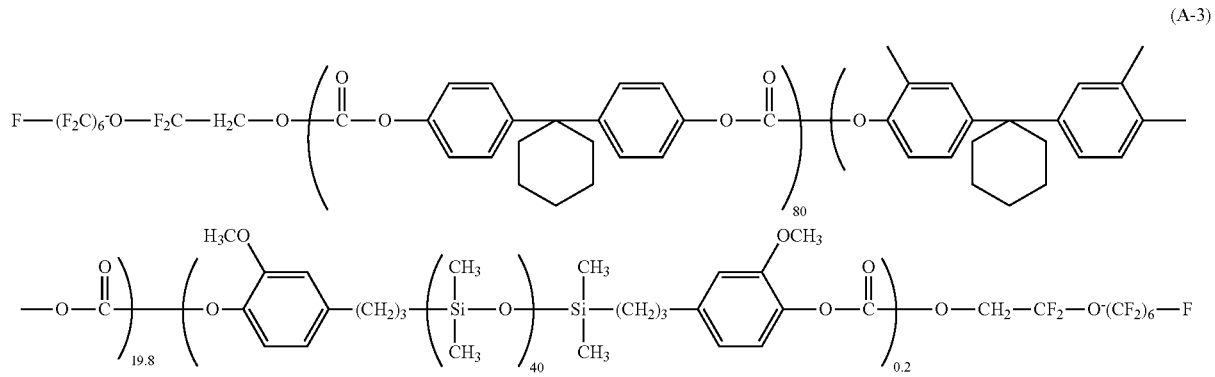

(A-3)

The bisphenol Z bischloroformate oligomer solution that was synthesized in example 2 in an amount of 349 ml was dissolved in 112 ml of methylene chloride. Furthermore, after 3.8 g of 2,2-difluoro-2-(perfluorohexyloxy)ethanol that served as an end-terminator and 1.6 g of polydimethylsiloxane that had eugenol-modified both ends and the following structure were added, 18 ml of a 2 mol/L potassium hydroxide aqueous solution were added, and 0.5 ml of a 7 mass % triethylamine aqueous solution that served as a catalyst was added. After 15 minute vigorous agitation, to the resulting solution, a solution that dissolved 14 g of 1,1-bis(3-methyl-4-hydroxy)cyclohexane in 138 ml of a 2 mol/L potassium hydroxide aqueous solution was added. Then, while the resulting mixed solution was vigorously agitated, 1.0 ml of the 7 mass % triethylamine aqueous solution that served as a catalyst was further added. At 15° C. with agitation, reaction was performed for 1.5 hours. After the reaction terminated, the resulting reaction product was diluted with 1000 ml of methylene chloride, and then ashed with 200 ml of water twice, 200 ml of 0.01 mol/L hydrochloric acid once, further 200 ml of water twice successively. Similarly to example 1, the resulting organic layer was dropped into a mixed solution of water and 2-propanol (3:2 by volume ratio) that was heated at about 70° C. so as to obtain the polycarbonate resin (A-3) described above.

The reduced viscosity [$\eta_{SP}/C$] of thus obtained polycarbonate resin (A-3) was 0.4 dl/g. By NMR analysis, the polycarbonate resin (A-3) was confirmed to have the above repeating unit and composition.

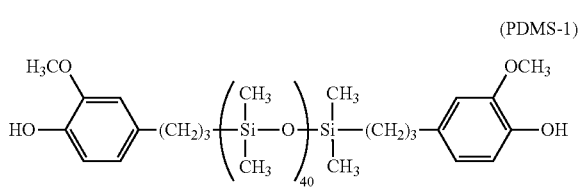

(PDMS-1)

Example 4

Synthesis of Polycarbonate Resin (B-1)

1. Synthesis of Bisphenol B-Biscresolfluorene co-Bischloroformate Oligomer

A solution that dissolved 92 g of 2,2-bis(4-hydroxyphenyl)butane (bisphenol B) and 144 g of biscresolfluorene in 1.2 kg of a 16 mass % potassium hydroxide aqueous solution was mixed with 1.4 kg of methylene chloride. While the resulting solution was agitated and cooled, phosgene gas was blown into the solution at a rate of 1 L/minute until the pH reached 9 or less. Then, the reaction solution was stood still so as to be separated. In the resulting organic layer, a methylene chloride solution of bisphenol B-biscresolfluorene co-bischloroformate oligomer that had a polymerization degree of 2 to 6 and a chloroformate group on the molecular end thereof was obtained. The solution thus obtained had a chloroformate concentration of 0.41 mol/L and a solid content concentration of 0.25 kg/L.

2. Synthesis of Polycarbonate Resin (B-1)

Then, 358 ml of the above bisphenol B-biscresolfluorene co-bischloroformate oligomer solution were dissolved in 189 ml of methylene chloride. Furthermore, after 2.5 g of 2,2-difluoro-2-(perfluorohexyloxy)ethanol that served as an end-terminator were added, 60 ml of a 2 mol/L potassium hydroxide aqueous solution were added, and 0.8 ml of a 7 mass % triethylamine aqueous solution that served as a catalyst was added. After 15 minute vigorous agitation, to the resulting solution, a solution that dissolved 6.1 g of bisphenol B and 9.7 g of biscresolfluorene in 140 ml of a 2 mol/L potassium hydroxide aqueous solution was added. Then, while the resulting mixed solution was vigorously agitated, 1.0 ml of the 7 mass % triethylamine aqueous solution that served as a catalyst was further added. At 15° C. with agitation, reaction was performed for 1.5 hours. After the reaction terminated, the resulting reaction product was diluted with 1000 ml of methylene chloride, and then washed with 200 ml of water twice, 200 ml of 0.01 mol/L hydrochloric acid once, further 200 ml of water twice successively. Similarly to example 1, the resulting organic layer was dropped into a mixed solution of water and 2-propanol (3:2 by volume ratio) that was heated at about 70° C. so as to obtain the polycarbonate resin (B-1) described above.

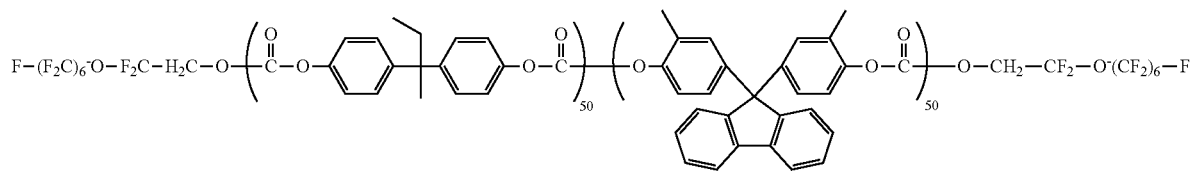

(B-1)

The reduced viscosity [$\eta_{SP}/C$] of thus obtained polycarbonate resin (B-1) was 0.6 dl/g. By NMR analysis, the polycarbonate resin (B-1) was confirmed to have the above repeating unit and composition.

Example 5

Synthesis of Polycarbonate Resin (B-2)

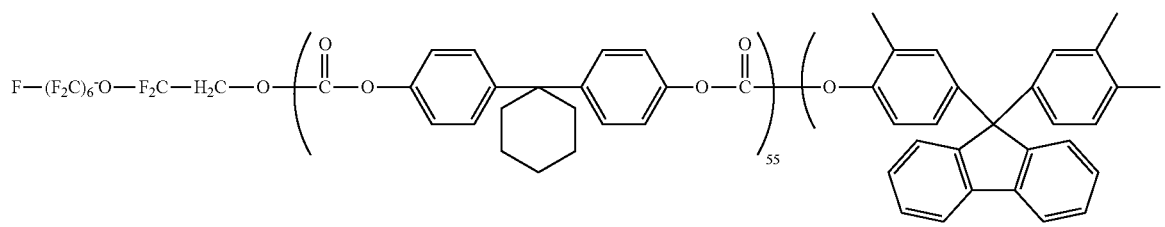

(B-2)

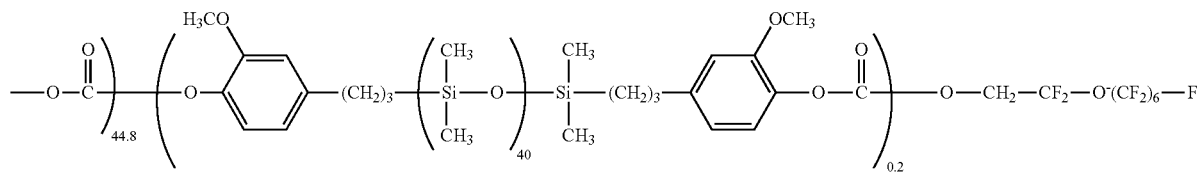

1. Synthesis of Bisphenol Z-Biscresolfluorene co-Bischloroformate Oligomer

A solution that dissolved 120 g of 1,1-bis(4-hydroxyphenyl)cyclohexanone (bisphenol Z) and 115 g of biscresolfluorene in 1.2 kg of a 16 mass % potassium hydroxide aqueous solution was mixed with 1.4 kg of methylene chloride. While the resulting solution was agitated and cooled, phosgene gas was blown into the solution at a rate of 1 L/minute until the pH reached 9 or less. Then, the reaction solution was stood still so as to be separated. In the resulting organic layer, a methylene chloride solution of bisphenol Z-biscresolfluorene co-bischloroformate oligomer that had a polymerization degree of 2 to 6 and a chloroformate group on the molecular end thereof was obtained. The solution thus obtained had a chloroformate concentration of 0.21 mol/L and a solid content concentration of 0.21 kg/L.

2. Synthesis of Polycarbonate Resin (B-2)

Then, 377 ml of the above bisphenol Z-biscresolfluorene co-bischloroformate oligomer solution were dissolved in 166 ml of methylene chloride. Furthermore, after 1.5 g of 2,2-difluoro-2-(perfluorohexyloxy)ethanol that served as an end-terminator and 1.2 g of the above PDMS-1 were added, 60 ml of a 2 mol/L potassium hydroxide aqueous solution were added, and 0.8 ml of a 7 mass % triethylamine aqueous solution that served as a catalyst was added. After 15 minute vigorous agitation, to the resulting solution, a solution that dissolved 11 g of biscresolfluorene in 140 ml of a 2 mol/L potassium hydroxide aqueous solution was added. Then, while the resulting mixed solution was vigorously agitated, 1.0 ml of the 7 mass % triethylamine aqueous solution that served as a catalyst was further added. At 15° C. with agitation, reaction was performed for 1.5 hours. After the reaction terminated, the resulting reaction product was diluted with 1000 ml of methylene chloride, and then washed with 200 ml of water twice, 200 ml of 0.01 mol/L hydrochloric acid once, further 200 ml of water twice successively. Similarly to example 1, the resulting organic layer was dropped into a mixed solution of water and 2-propanol (3:2 by volume ratio) that was heated at about 70° C. so as to obtain the polycarbonate resin (B-2) described above.

The reduced viscosity $[\eta_{SP}/C]$ of thus obtained polycarbonate resin (B-2) was 0.7 dl/g. By NMR analysis, the polycarbonate resin (B-2) was confirmed to have the above repeating unit and composition.

Example 6

Synthesis of Polycarbonate Resin (A-4)

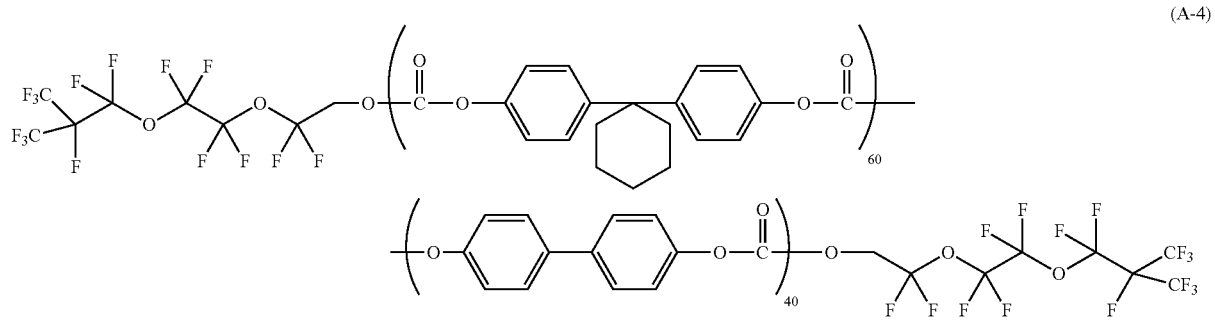

(A-4)

Synthesis was performed similarly to example 1, except that, in example 1,2,2-difluoro-2-(1,1,2,2-tetrafluoro-2-(1,1,2,3,3,3-hexafluor-2-(trifluoromethyl)propoxy)ethoxy)ethanol was used in place of 0.13 g of 2,2-difluoro-2-(perfluorohexyloxy)ethanol, so that the polycarbonate resin (A-4) described above was obtained.

The reduced viscosity [$\eta_{SP}/C$] of thus obtained polycarbonate resin (A-4) was 1.1 dl/g. By NMR analysis, the polycarbonate resin (A-4) was confirmed to have the above repeating unit and composition.

Example 7

Synthesis of Polycarbonate Resin (A-5)

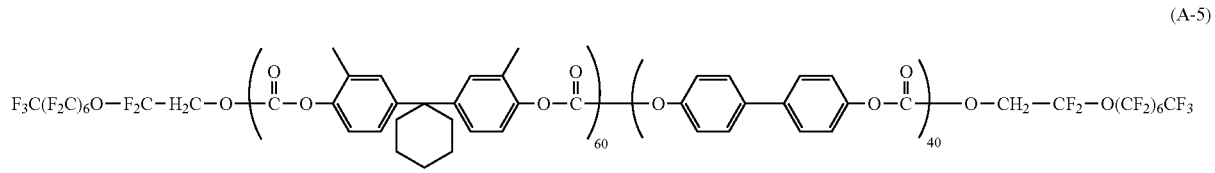

(A-5)

Synthesis was performed similarly to example 1, except that, in example 1,1,1-bis(3-methyl-4-hydroxyphenyl)cyclohexane (bisphenol Z) was used in place of 1,1-bis(4-hydroxyphenyl)cyclohexane (bisphenol Z), so that the polycarbonate resin (A-5) described above was obtained.

The reduced viscosity [$\eta_{SP}/C$] of thus obtained polycarbonate resin (A-5) was 1.0 dl/g. By NMR analysis, the polycarbonate resin (A-5) was confirmed to have the above repeating unit and composition.

Example 8

Synthesis of Polycarbonate Resin (A-6)

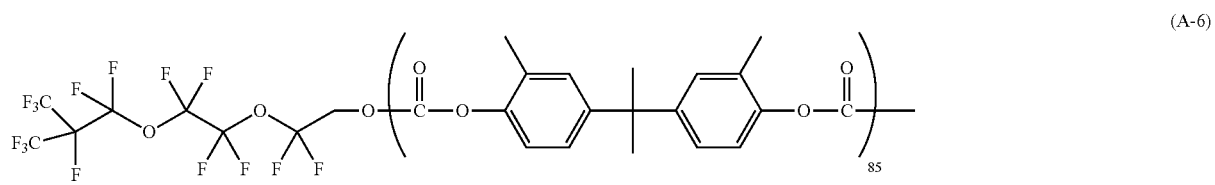

(A-6)

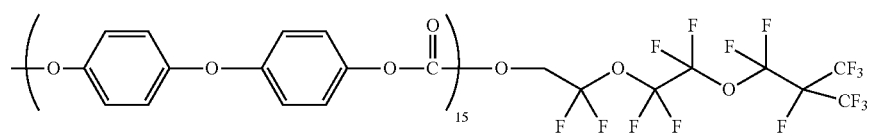

Synthesis was performed similarly to example 2, except that, in example 2, 2,2-bis(3-methyl-4-hydroxyphenyl)propane was used in place of 1,1-bis(4-hydroxyphenyl)cyclohexane (bisphenol Z), 4,4'-dihydroxydiphenyl ether was used in place of 4,4'-biphenol, further 2,2-difluoro-2-(1,1,2,2-tetrafluoro-2-(1,1,2,3,3,3-hexafluoro-2-(trifluoromethyl)propoxy)ethoxy)ethanol was used in place of 2,2-difluoro-2-(perfluorohexyloxy)ethanol, the polycarbonate resin (A-6) described above was obtained.

The reduced viscosity [$\eta_{SP}/C$] of thus obtained polycarbonate resin (A-6) was 0.5 dl/g. By NMR analysis, the polycarbonate resin (A-6) was confirmed to have the above repeating unit and composition.

Example 9

Synthesis of Polycarbonate Resin (A-7)

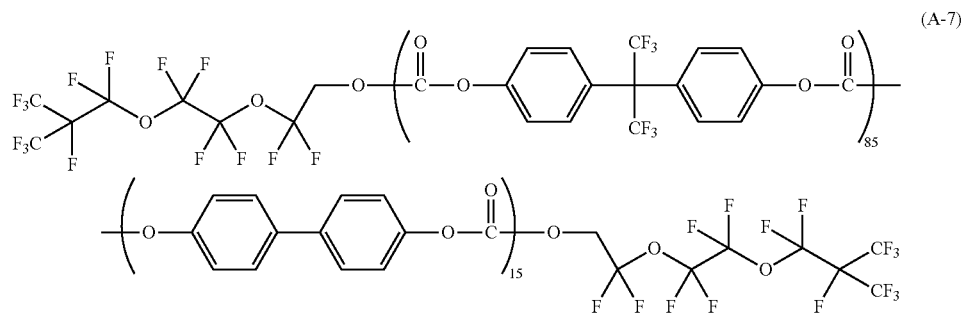

Synthesis was performed similarly to example 2, except that, in example 2, 2,2-bis(4-hydroxyphenyl)hexafluoropropane was used in place of 1,1-bis(4-hydroxyphenyl)cyclohexane (bisphenol Z), and 2,2-difluoro-2-(1,1,2,2-tetrafluoro-2-(1,1,2,3,3,3-hexafluoro-2-(trifluoromethyl)propoxy)ethoxy)ethanol was used in place of 2,2-difluoro-2-(perfluorohexyloxy)ethanol, the polycarbonate resin (A-7) described above was obtained.

The reduced viscosity [$\eta_{SP}/C$] of thus obtained polycarbonate resin (A-7) was 0.5 dl/g. By NMR analysis, the polycarbonate resin (A-7) was confirmed to have the above repeating unit and composition.

Comparative Example 1

Synthesis of Polycarbonate Resin (C-1)

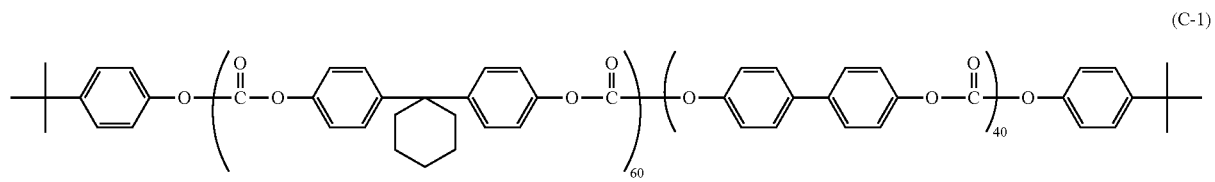

Similarly to example 1, except that "0.13 g of 2,2-difluoro-2-(perfluorohexyloxy)ethanol" added was changed to "0.04 g of p-tert-butylphenol", the polycarbonate resin (C-1) described above was obtained. The reduced viscosity [$\eta_{SP}/C$] of the resulting polycarbonate resin (C-1) was 1.1.

Comparative Example 2

Synthesis of Polycarbonate Resin (C-2)

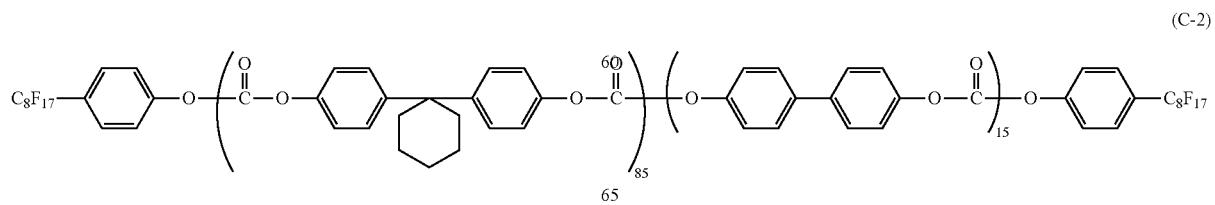

Similarly to example 2, except that "0.13 g of 2,2-difluoro-2-(perfluorohexyloxy)ethanol" added was changed to "4.1 g of 4-(perfluorooctyl)phenol", the polycarbonate resin (C-2) described above was obtained. The reduced viscosity [η$_{SP}$/C] of the resulting polycarbonate resin (C-2) was 0.7.

Comparative Example 3

Synthesis of Polycarbonate Resin (C-3)

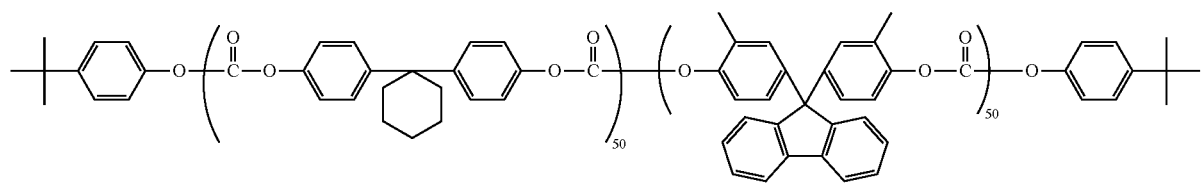

(C-3)

Similarly to example 5, except that (PDMS-1) was not added and that "1.5 g of 2,2-difluoro-2-(perfluorohexyloxy) ethanol" was changed to "0.5 g of p-tert-butylphenol", the polycarbonate resin (C-3) described above was obtained. The reduced viscosity [η$_{SP}$/C] of the resulting polycarbonate resin (C-3) was 0.7.

Comparative Example 4

Polycarbonate Resin (C-4)

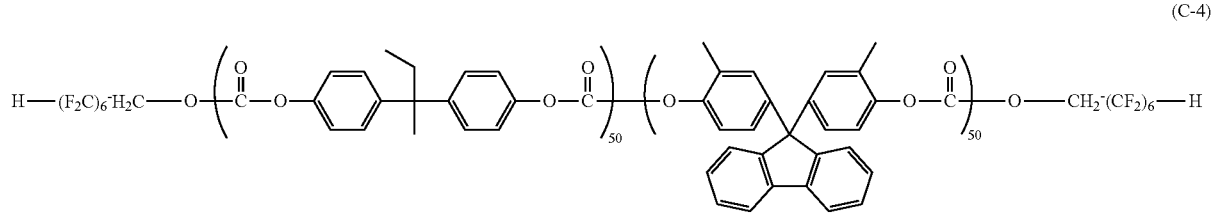

(C-4)

Similarly to example 4, except that "2.5 g of 2,2-difluoro-2-(perfluorohexyloxy)ethanol" added was changed to "2.0 g of 2,2,3,3,4,4,5,5,6,6,7,7-dodecafluoroheptane-1-ol", the polycarbonate resin (C-4) described above was obtained. The reduced viscosity [η$_{SP}$/C] of the resulting polycarbonate resin (C-4) was 0.7.

Example 10

Preparation of Coating onto Polycarbonate Film

A coating solution that dissolved the resin (A-1) synthesized in example 1 in toluene was prepared. The coating solution was coated with an applicator onto a polycarbonate film ("POLYCAACE" (trade name, manufactured by Sumitomo Bakelite Co., Ltd., 0.3 mm thick) in a manner that 20 μm of thickness was obtained after dried, then dried to prepare a film sample. The film sample was evaluated, in terms of haze, contact angles to water and hexadecane, and friction coefficient, by using the aforementioned measurement methods. The results are shown in Table 1.

Example 11

Except that the resin (A-2) that was synthesized in example 2 was used in place of the resin (A-1), similarly to example 10, a film sample was prepared. Each of the evaluations was performed. The results are shown in Table 1.

Example 12

Except that the resin (A-3) that was synthesized in example 3 was used in place of the resin (A-1), similarly to example 10, a film sample was prepared. Each of the evaluations was performed. The results are shown in Table 1.

Example 13

Except that the resin (B-1) that was synthesized in example 4 was used in place of the resin (A-1), similarly to example 10, a film sample was prepared. Each of the evaluations was performed. The results are shown in Table 1.

Example 14

Except that the resin (B-2) that was synthesized in example 5 was used in place of the resin (A-1), similarly to example 10, a film sample was prepared. Each of the evaluations was performed. The results are shown in Table 1.

Example 15

Except that the resin (A-4) that was synthesized in example 6 was used in place of the resin (A-1), similarly to example 10, a film sample was prepared. Each of the evaluations was performed. The results are shown in Table 1.

Example 16

Except that the resin (A-5) that was synthesized in example 7 was used in place of the resin (A-1), similarly to example 10, a film sample was prepared. Each of the evaluations was performed. The results are shown in Table 1.

Example 17

Except that the resin (A-6) that was synthesized in example 8 was used in place of the resin (A-1), similarly to example 10, a film sample was prepared. Each of the evaluations was performed. The results are shown in Table 1.

Example 18

Except that the resin (A-7) that was synthesized in example 9 was used in place of the resin (A-1), similarly to example 10, a film sample was prepared. Each of the evaluations was performed. The results are shown in Table 1.

Comparative Example 5

Except that the resin (C-1) that was synthesized in comparative example 1 was used in place of the resin (A-1), similarly to example 10, a film sample was prepared. Each of the evaluations was performed. The results are shown in Table 1.

Comparative Example 6

Except that the resin (C-2) that was synthesized in comparative example 2 was used in place of the resin (A-1), similarly to example 10, a film sample was prepared. Each of the evaluations was performed. The results are shown in Table 1.

Comparative Example 7

Except that the resin (C-3) that was synthesized in comparative example 3 was used in place of the resin (A-1), similarly to example 10, a film sample was prepared. Each of the evaluations was performed. The results are shown in Table 1.

Comparative Example 8

Except that the resin (C-4) that was synthesized in comparative example 4 was used in place of the resin (A-1), similarly to example 10, a film sample was prepared. Each of the evaluations was performed. The results are shown in Table 1.

TABLE 1

| | Polycarbonate resins | | Haze (—) | Contact angle (°) Water | Contact angle (°) Hexadecane | Friction coefficient (—) Static friction coefficient | Friction coefficient (—) Dynamic friction coefficient |
|---|---|---|---|---|---|---|---|
| Example 10 | A-1 | Example 1 | 0.4 | 101 | 42 | 0.70 | 0.40 |
| Example 11 | A-2 | Example 2 | 0.4 | 102 | 48 | 0.70 | 0.50 |
| Example 12 | A-3 | Example 3 | 0.4 | 104 | 47 | 0.18 | 0.08 |
| Example 13 | B-1 | Example 4 | 0.4 | 101 | 45 | 0.60 | 0.30 |
| Example 14 | B-2 | Example 5 | 0.4 | 101 | 44 | 0.60 | 0.30 |
| Example 15 | A-4 | Example 6 | 0.4 | 101 | 42 | 0.70 | 0.30 |
| Example 16 | A-5 | Example 7 | 0.4 | 102 | 42 | 0.60 | 0.30 |
| Example 17 | A-6 | Example 8 | 0.4 | 101 | 42 | 0.60 | 0.30 |
| Example 18 | A-7 | Example 9 | 0.4 | 103 | 42 | 0.70 | 0.30 |
| Comparative Example 5 | C-1 | Comparative Example 1 | 0.4 | 91 | 9 | 1.20 | 0.70 |
| Comparative Example 6 | C-2 | Comparative Example 2 | 1.0 | 108 | 70 | 1.00 | 0.60 |
| Comparative Example 7 | C-3 | Comparative Example 3 | 0.4 | 90 | 10 | 0.80 | 0.50 |
| Comparative Example 8 | C-4 | Comparative Example 4 | 0.4 | 95 | 12 | 0.90 | 0.50 |

According to the results shown in Table 1, the films of examples 10 to 18 that were prepared by using the polycarbonate resins of the present invention provide excellent transparency and exhibit good water repellency and oil repellency. Furthermore, the friction coefficient is low and the surface lubricity is excellent. On the other hand, the films of comparative examples 5 to 8 provide such results that either of the performances described above is inferior.

Examples 19 to 27, Comparative Examples 9 to 12

Each film sample that was prepared in examples 10 to 18 and comparative examples 5 to 8 was subjected to the Suga abrasion test in accordance with the aforementioned method. For each film sample, the amount of abrasion after the test and the contact angle and friction coefficient after abrasion were measured. The results are shown in Table 2.

binder resin, 0.5 part by mass of butyral resin was used. These were added to 19 parts by mass of methylene chloride that served as a solvent, and dispersed with a ball mill. The resulting dispersion was coated on the surface of the electroconductive base film with a bar coater, and dried to form a charge generating layer having a thickness of about 0.5 μm.

Then, 0.5 g of an aromatic amine compound (CTM-1) that was represented by the following formula and served as a charge transport chemical and 0.5 g of the polycarbonate resin (A-1) that was obtained in example 1 and served as a binder resin were dispersed in 10 ml of tetrahydrofuran to prepare a coating solution. The coating solution thus obtained was coated on the charge generating layer with an applicator, and dried to form a charge transport layer having a thickness of about 20 μm, so that an electrophotographic photoreceptor was fabricated.

The resulting electrophotographic photoreceptor was subjected to the aforementioned abrasion resistance evaluation. The result is shown in Table 2.

TABLE 2

| | Polycarbonate resins | | Amount of abrasion (mg) | Contact angle (°) | | Friction coefficient (—) | |
| --- | --- | --- | --- | --- | --- | --- | --- |
| | | | | Water | Hexadecane | Static friction coefficient | Dynamic friction coefficient |
| Example 19 | A-1 | Example 1 | 0.40 | 98 | 40 | 0.70 | 0.40 |
| Example 20 | A-2 | Example 2 | 1.50 | 96 | 43 | 0.70 | 0.50 |
| Example 21 | A-3 | Example 3 | 1.80 | 104 | 47 | 0.30 | 0.20 |
| Example 22 | B-1 | Example 4 | 2.30 | 97 | 39 | 0.18 | 0.30 |
| Example 23 | B-2 | Example 5 | 2.40 | 101 | 40 | 0.60 | 0.50 |
| Example 24 | A-4 | Example 6 | 0.35 | 99 | 41 | 0.60 | 0.30 |
| Example 25 | A-5 | Example 7 | 0.35 | 98 | 41 | 0.60 | 0.40 |
| Example 26 | A-6 | Example 8 | 1.40 | 98 | 38 | 0.60 | 0.30 |
| Example 27 | A-7 | Example 9 | 1.70 | 99 | 39 | 0.60 | 0.40 |
| Comparative Example 9 | C-1 | Comparative Example 1 | 0.40 | 90 | 9 | 0.80 | 0.70 |
| Comparative Example 10 | C-2 | Comparative Example 2 | 1.60 | 85 | 15 | 0.90 | 0.70 |
| Comparative Example 11 | C-3 | Comparative Example 3 | 2.80 | 89 | 9 | 0.80 | 0.50 |
| Comparative Example 12 | C-4 | Comparative Example 4 | 2.50 | 91 | 10 | 0.80 | 0.50 |

According to the results shown in Table 2, the coating that was formed by coating the coating solution that included therein the polycarbonate resin of the present invention provides excellent abrasion resistance, having good water repellency and oil repellency after abrasion. The surface lubricity is also good because the friction coefficient is low.

Example 28

An electrophotographic photoreceptor having a laminated photoreceptor layer was produced by using, as an electroconductive base, a polyethylene terephthalate resin film ("METARUMI" manufactured by Toray Industries Inc.) with vacuum deposited aluminum metal, and laminating, on the surface thereof, a charge generating layer and a charge transport layer successively. As a charge generating chemical, 0.5 part by mass of oxo-titanium phthalocyanine was used. As a

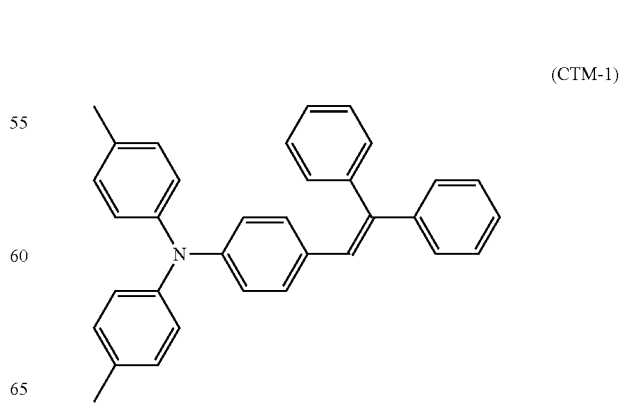

(CTM-1)

Comparative Example 13

Except that the resin (C-1) that was obtained in comparative example 1 was used in place of the resin (A-1), similarly to example 28, an electrophotographic photoreceptor was fabricated. The abrasion resistance evaluation was performed. The result was shown in Table 3.

TABLE 3

|  |  |  | | Before abrasion | | After abrasion | |
|---|---|---|---|---|---|---|---|
|  | Polycarbonate resins |  | Amount of abrasion (mg) | Contact angle to water (°) | Static friction coefficient (—) | Contact angle to water (°) | Static friction coefficient (—) |
| Example 28 | A-1 | Example 1 | 2.2 | 98 | 0.6 | 96 | 0.5 |
| Comparative Example 13 | C-1 | Comparative Example 1 | 3.0 | 89 | 1.0 | 87 | 0.9 |

According to the results shown in Table 3, the electrophotographic photoreceptor of example 28, which was fabricated by using the polycarbonate resin of the present invention, has a smaller amount of abrasion as compared with the photoreceptor of comparative example 13, exhibiting an excellent abrasion resistance. In addition, the water repellency and surface lubricity are excellent. Even after abrasion, both of excellent water repellency and surface lubricity are shown to be unchanged.

INDUSTRIAL APPLICABILITY

The polycarbonate resin of the present invention that has a specific structure is allowed to be dissolved in a variety of non-halogen organic solvents and provide an uniform solution. A molded article that is formed by using the solution as a coating solution has excellent transparency, exhibiting good water repellency and oil repellency. In addition, the friction coefficient is reduced, so that the molded article is also provided with excellent surface lubricity and abrasion resistance.

Therefore, the polycarbonate resin of the present invention is allowed to be used preferably for electrophotographic photoreceptors, charging rolls, and development rolls, or as a coating material for the surface of the belts thereof and the like. Furthermore, the polycarbonate resin is applicable to surface coating for optical films of polycarbonate, polyester, acryl and the like, glass, and others.

The invention claimed is:

1. A polycarbonate resin that is represented by the following formula (1),

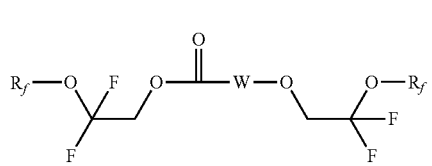

in the formula (1), $R_f$ represents a perfluoroalkyl group having 5 or more carbon atoms and 11 or more fluorine atoms or a perfluoroalkyloxy group represented by the following formula (2); W represents a structural unit represented by the following formula (3) or a divalent group that contains a naphthalene ring,

in the formula (2), $R_{f2}$ represents a straight-chain or branched perfluoroalkyl group having 1 to 6 carbon atoms; and $n^6$ represents an integer of 1 to 3,

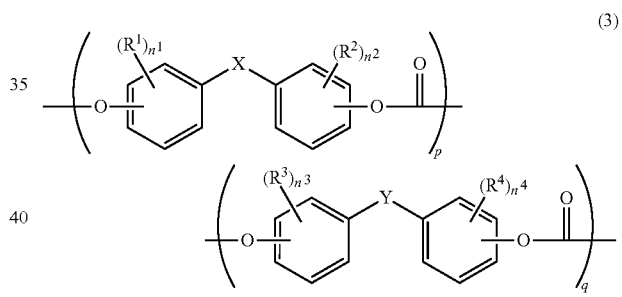

in the formula (3), each of p and q represents a composition ratio (mol ratio) of a structural unit in each bracket respectively; each of $R^1$ to $R^4$ represents, independently from each other, a halogen atom, an alkyl group that may have a substitution group and has 1 to 6 carbon atoms, an alkoxy group that may have a substitution group and has 1 to 6 carbon atoms, a fluoroalkyl group that may have a substitution group and has 1 to 6 carbon atoms, a fluoroalkoxy group that may have a substitution group and has 1 to 6 carbon atoms, or a phenyl group that may have a substitution group; X represents a single bonding, an alkylene group that may have a substitution group and has 1 to 18 carbon atoms, an alkylidene group that may have a substitution group and has 2 to 18 carbon atoms, a cycloalkylene group that may have a substitution group and has 5 to 15 carbon atoms, a cycloalkylidene group that may have a substitution group and has 5 to 15 carbon atoms, —S—, —SO—, —SO$_2$—, —O—, —CO—, or a divalent group represented by the following formula (4) or formula (5); each of $n^1$ and $n^2$ represents, independently from each other, an integer of 0 to 4; Y represents a single bonding, an alkylene group having 1 to 18 carbon atoms, an alkylidene group having 2 to 18 carbon atoms, a cycloalkylene group having 5 to 15 carbon atoms, a cycloalkylidene group having 5 to 15 carbon atoms, —S—, —SO—, —SO$_2$—, —O—, —CO—, or a divalent group represented by the following formula (4) or formula (5); and each of n$^3$ and n$^4$ represents, independently from each other, an integer of 0 to 4, but a case in which both n$^3$ and n$^4$ are zero and Y is an isopropylidene group is eliminated, and

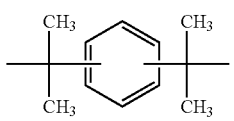

(4)

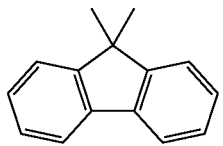

(5)

in the formula (5), benzene ring may be substituted with an alkyl group having 1 to 22 carbon atoms or a phenyl group that may have a substitution group.

2. The polycarbonate resin according to claim 1, wherein in the formula (2), R$_{f2}$ is a straight-chain or branched perfluoroalkyl group having 1 to 5 carbon atoms.

3. The polycarbonate resin according to claim 1, wherein W in the formula (1) has an organic siloxane containing group additionally.

4. The polycarbonate resin according to claim 3, wherein the organic siloxane containing group is a divalent group that has a structure represented by the following formula (6),

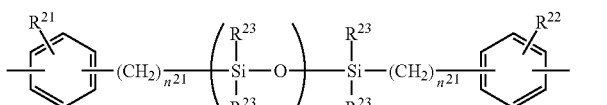

(6)

in the formula (6), each of R$^{21}$ and R$^{22}$ represents, independently from each other, a hydrogen atom, a halogen atom, a substituted or non-substituted alkyl group having 1 to 12 carbon atoms, a substituted or non-substituted alkoxy group having 1 to 12 carbon atoms, or a substituted or non-substituted aryl group having 6 to 12 carbon atoms; each R$^{23}$ represents, independently from each other, a substituted or non-substituted alkyl group having 1 to 12 carbon atoms or a substituted or non-substituted aryl group having 6 to 12 carbon atoms; each n$^{21}$ represents, independently from each other, an integer of 2 to 4; and n$^{22}$ represents an integer of 1 to 600.

5. The polycarbonate resin according to claim 1, wherein the polycarbonate resin represented by the formula (1) comprises at least one of structural units represented by the following formulas (7) to (13),

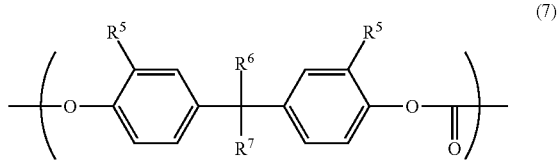

(7)

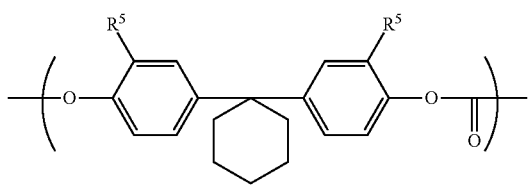

(8)

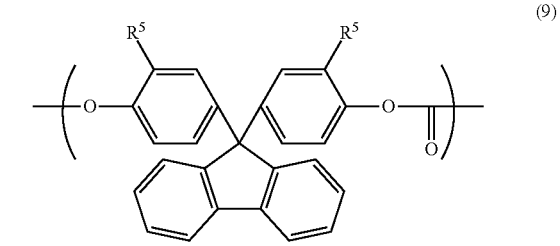

(9)

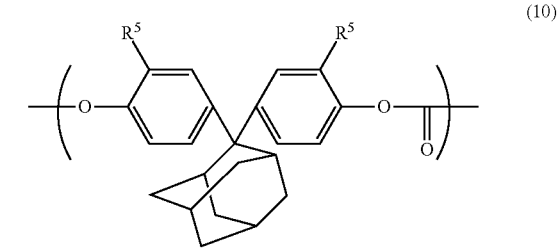

(10)

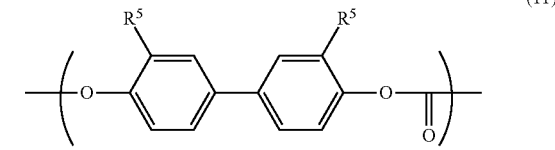

(11)

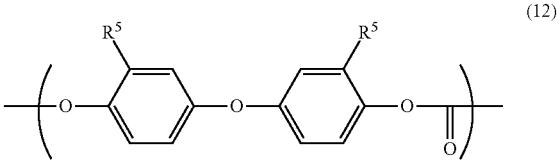

(12)

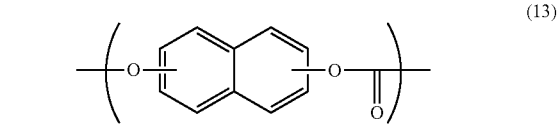

(13)

in the formulas, each of R$^5$ to R$^7$ represents, independently from each other, a hydrogen atom, a halogen atom, an alkyl group that may have a substitution group and has 1 to 6 carbon atoms, an alkoxy group that may have a substitution group and has 1 to 6 carbon atoms, a fluoroalkyl group that may have a substitution group and has 1 to 6 carbon atoms, a fluoroalkoxy group that may have a substitution group and has 1 to 6 carbon atoms, or a phenyl group that may have a substitution group.

6. The polycarbonate resin according to claim 1, produced by using any of fluorine-containing alcohols represented by the following formulas (14), (15), and (15a) as an end-terminator,

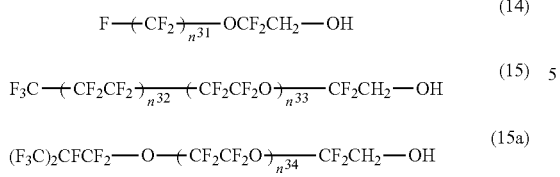

(14)

(15)

(15a)

in the formulas, $n^{31}$ represents an integer of 5 to 8; $n^{32}$ represents an integer of 0 to 2; $n^{33}$ represents an integer of 1 to 3; and $n^{34}$ represents an integer of 1 to 3.

7. The polycarbonate resin according to claim 1, produced by using any of fluorine-containing alcohols represented by the following formula as an end-terminator,

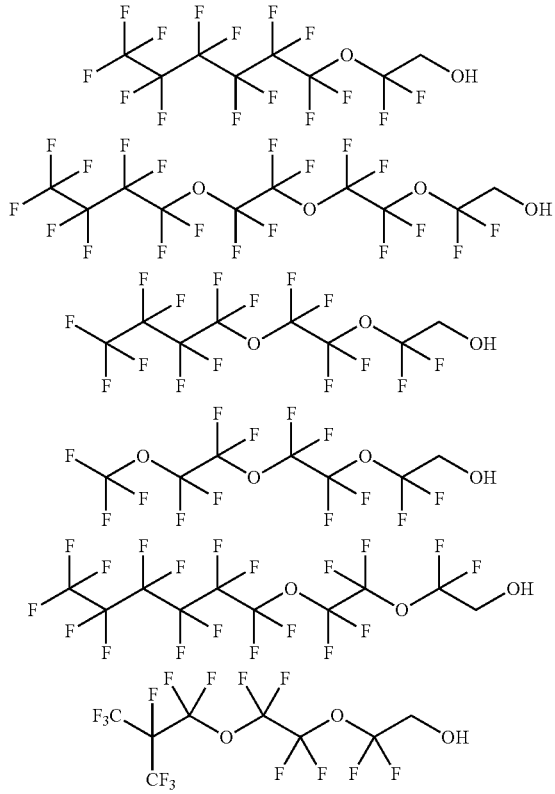

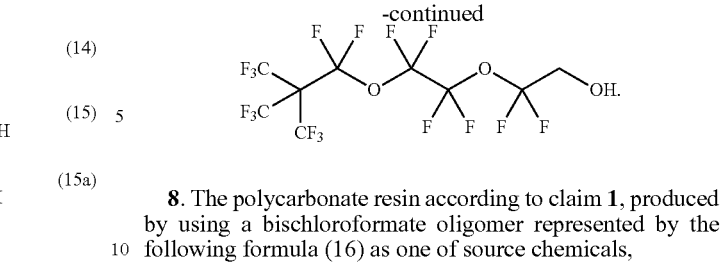

8. The polycarbonate resin according to claim 1, produced by using a bischloroformate oligomer represented by the following formula (16) as one of source chemicals, (16)

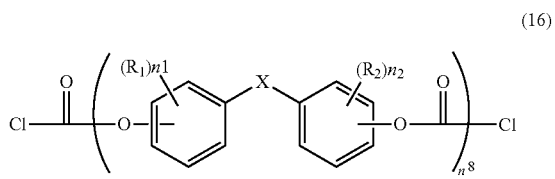

in the formula, each of $R^1$, $R^2$, X, $n^1$, and $n^2$ represents the same as in the formula (3); and $n^8$ represents an average number of monomeric units of the bischloroformate oligomer and the value thereof is 1.0 to 1.99.

9. A polycarbonate resin containing coating solution, comprising the polycarbonate resin according to claim 1 and a non-halogen solvent.

10. The polycarbonate resin containing coating solution according to claim 9, wherein the non-halogen solvent is at least one selected from a group consisting of an aromatic solvent, an ether solvent, a ketone solvent, an amide solvent, and an ester solvent.

11. A molded article, produced by molding the polycarbonate resin containing coating solution according to claim 9.

12. The molded article according to claim 11, having a water contact angle of 95 degree or more and a hexadecane contact angle of 20 degree or more as measured on the surface thereof.

13. An electrophotographic photoreceptor, comprising at least the molded article according to claim 11.

14. A drum, comprising at least the molded article according to claim 11.

15. A roll, comprising at least the molded article according to claim 11.

16. A cast film, produced by molding the polycarbonate resin containing coating solution according claim 9, through a casting process.

17. A coating film, produced by molding the polycarbonate resin containing coating solution according to claim 9, through a coating process.

\* \* \* \* \*